United States Patent
Raines et al.

(10) Patent No.: US 7,593,889 B2
(45) Date of Patent: Sep. 22, 2009

(54) SYSTEM AND METHOD FOR PROCESSING DATA PERTAINING TO FINANCIAL ASSETS

(75) Inventors: Franklin D. Raines, Washington, DC (US); Julie G. St. John, Washington, DC (US); Michael A. Quinn, Potomac, MD (US); Robert A. Lewis, Potomac, MD (US); William F. Farrell, Vienna, VA (US); John L. Kemper, Vienna, VA (US)

(73) Assignee: Fannie Mae, Washington, DC (US)

( * ) Notice: Subject to any disclaimer, the term of this patent is extended or adjusted under 35 U.S.C. 154(b) by 1400 days.

(21) Appl. No.: 10/331,811

(22) Filed: Dec. 30, 2002

(65) Prior Publication Data

US 2004/0128229 A1    Jul. 1, 2004

(51) Int. Cl.
G06Q 40/00    (2006.01)
(52) U.S. Cl. .................. 705/38; 705/35; 705/37
(58) Field of Classification Search .............. 705/35, 705/37, 38
See application file for complete search history.

(56) References Cited

U.S. PATENT DOCUMENTS

| | | |
|---|---|---|
| 3,316,395 A | 4/1967 | Lavin |
| 4,876,648 A | 10/1989 | Lloyd |
| 5,239,462 A | 8/1993 | Jones et al. |
| 5,262,941 A | 11/1993 | Saladin et al. |
| 5,274,547 A | 12/1993 | Zoffel et al. |
| 5,323,315 A | 6/1994 | Highbloom |
| 5,361,201 A | 11/1994 | Jost et al. |
| 5,414,621 A | 5/1995 | Hough |
| 5,537,315 A | 7/1996 | Mitcham |
| 5,563,783 A | 10/1996 | Stolfo et al. |
| 5,611,052 A | 3/1997 | Dykstra et al. |
| 5,615,268 A | 3/1997 | Bisbee et al. |
| 5,689,649 A | 11/1997 | Altman et al. |
| 5,696,907 A | 12/1997 | Tom |
| 5,699,527 A | 12/1997 | Davidson |
| 5,732,400 A | 3/1998 | Mandler et al. |

(Continued)

FOREIGN PATENT DOCUMENTS

JP    04182868    6/1992

(Continued)

OTHER PUBLICATIONS

Hamecs, Michelle. Mortgage securities developments. Housing Econimics. Washington: Jul. 2000. vol. 48, Iss.7; p. 7, 3 pg.*

(Continued)

*Primary Examiner*—Stefanos Karmis
(74) *Attorney, Agent, or Firm*—Foley & Lardner LLP

(57) ABSTRACT

A data processing system for processing loan data comprises acquisition logic, reporting logic, and financial asset generation logic. The acquisition logic is configured to receive information pertaining to loan term, interest rate, principal owed and other parameters for a plurality of loans. The reporting logic is configured to receive payment information regarding borrower payments in connection with the plurality of loans. The financial asset generation logic is configured to facilitate creation and maintenance of a plurality of financial assets backed by the plurality of loans. The acquisition logic, the reporting logic, and the financial asset generation logic are provided on a common integrated data processing platform.

32 Claims, 6 Drawing Sheets

U.S. PATENT DOCUMENTS

| | | |
|---|---|---|
| 5,765,144 A | 6/1998 | Larche et al. |
| 5,797,133 A | 8/1998 | Jones et al. |
| 5,870,721 A | 2/1999 | Norris |
| 5,878,403 A | 3/1999 | DeFrancesco et al. |
| 5,878,404 A | 3/1999 | Stout, Jr. et al. |
| 5,930,775 A | 7/1999 | McCauley et al. |
| 5,930,776 A | 7/1999 | Dykstra et al. |
| 5,940,811 A | 8/1999 | Norris |
| 5,940,812 A | 8/1999 | Tengel et al. |
| 5,963,922 A * | 10/1999 | Helmering .................. 705/35 |
| 5,966,699 A | 10/1999 | Zandi |
| 5,966,700 A | 10/1999 | Gould et al. |
| 5,970,464 A | 10/1999 | Apte et al. |
| 5,974,372 A | 10/1999 | Barnes et al. |
| 5,983,206 A | 11/1999 | Oppenheimer |
| 5,995,947 A | 11/1999 | Fraser et al. |
| 6,014,645 A | 1/2000 | Cunningham |
| 6,021,202 A | 2/2000 | Anderson et al. |
| 6,029,149 A | 2/2000 | Dykstra et al. |
| 6,035,288 A | 3/2000 | Solomon |
| 6,044,362 A | 3/2000 | Neely |
| 6,070,151 A * | 5/2000 | Frankel .................... 705/36 R |
| 6,076,070 A | 6/2000 | Stack |
| 6,088,686 A | 7/2000 | Walker et al. |
| 6,105,007 A | 8/2000 | Norris |
| 6,112,190 A * | 8/2000 | Fletcher et al. .......... 705/36 R |
| 6,119,103 A | 9/2000 | Basch et al. |
| 6,125,349 A | 9/2000 | Maher |
| 6,144,948 A | 11/2000 | Walker et al. |
| 6,202,053 B1 | 3/2001 | Christiansen et al. |
| 6,226,624 B1 | 5/2001 | Watson et al. |
| 6,233,566 B1 | 5/2001 | Levine et al. |
| 6,289,319 B1 | 9/2001 | Lockwood |
| 6,311,169 B2 | 10/2001 | Duhon |
| 6,324,526 B1 | 11/2001 | D'Agostino |
| 6,367,013 B1 | 4/2002 | Bisbee et al. |
| 6,385,594 B1 | 5/2002 | Lebda et al. |
| 6,401,070 B1 | 6/2002 | McManus et al. |
| 6,405,181 B2 | 6/2002 | Lent et al. |
| 6,430,539 B1 | 8/2002 | Lazarus et al. |
| 6,438,526 B1 | 8/2002 | Dykes et al. |
| 6,505,176 B2 | 1/2003 | DeFrancesco, Jr. et al. |
| 6,513,018 B1 | 1/2003 | Culhane |
| 6,532,450 B1 | 3/2003 | Brown et al. |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,651,884 B2 | 11/2003 | Prendergast et al. |
| 6,671,673 B1 | 12/2003 | Baseman et al. |
| 6,778,968 B1 | 8/2004 | Gulati |
| 6,823,319 B1 | 11/2004 | Lynch et al. |
| 6,988,082 B1 | 1/2006 | Williams et al. |
| 6,999,942 B2 * | 2/2006 | Kemper et al. ................ 705/38 |
| 7,085,735 B1 * | 8/2006 | Hall et al. .................... 705/26 |
| 7,089,503 B1 | 8/2006 | Bloomquist et al. |
| 7,107,241 B1 | 9/2006 | Pinto |
| 7,146,337 B1 | 12/2006 | Ward et al. |
| 7,340,424 B2 | 3/2008 | Gang et al. |
| 7,461,020 B2 | 12/2008 | Kemper et al. |
| 2001/0001148 A1 | 5/2001 | Martin, Jr. et al. |
| 2001/0029482 A1 | 10/2001 | Tealdi et al. |
| 2001/0032177 A1 | 10/2001 | Starkman |
| 2001/0032178 A1 | 10/2001 | Adams et al. |
| 2001/0037287 A1 | 11/2001 | Broadbent et al. |
| 2001/0044772 A1 | 11/2001 | Allen et al. |
| 2002/0029154 A1 | 3/2002 | Majoor |
| 2002/0029194 A1 | 3/2002 | Lewis et al. |
| 2002/0032635 A1 | 3/2002 | Harris et al. |
| 2002/0032721 A1 * | 3/2002 | Chang ........................ 709/202 |
| 2002/0035520 A1 | 3/2002 | Weiss |
| 2002/0038318 A1 | 3/2002 | Cochran et al. |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059131 A1 | 5/2002 | Goodwin et al. |
| 2002/0059137 A1 | 5/2002 | Freeman et al. |
| 2002/0077968 A1 | 6/2002 | Kaniwa et al. |
| 2002/0082984 A1 | 6/2002 | Zappier |
| 2002/0087364 A1 | 7/2002 | Lerner et al. |
| 2002/0087389 A1 | 7/2002 | Sklarz et al. |
| 2002/0091550 A1 | 7/2002 | White et al. |
| 2002/0091630 A1 | 7/2002 | Inoue |
| 2002/0099650 A1 | 7/2002 | Cole |
| 2002/0107818 A1 | 8/2002 | McEwen et al. |
| 2002/0111835 A1 | 8/2002 | Hele et al. |
| 2002/0111891 A1 | 8/2002 | Hoffman et al. |
| 2002/0111896 A1 | 8/2002 | Ben-Levy et al. |
| 2002/0111901 A1 | 8/2002 | Whitney |
| 2002/0138414 A1 | 9/2002 | Baker, IV |
| 2002/0152155 A1 | 10/2002 | Greenwood et al. |
| 2002/0152165 A1 | 10/2002 | Dutta et al. |
| 2002/0152170 A1 | 10/2002 | Dutta et al. |
| 2002/0188535 A1 | 12/2002 | Chao et al. |
| 2002/0194109 A1 * | 12/2002 | Takeshi ....................... 705/37 |
| 2003/0018558 A1 | 1/2003 | Heffner et al. |
| 2003/0023610 A1 | 1/2003 | Bove et al. |
| 2003/0028478 A1 | 2/2003 | Kinney et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0046223 A1 | 3/2003 | Crawford et al. |
| 2003/0065614 A1 | 4/2003 | Sweeney |
| 2003/0093366 A1 | 5/2003 | Halper et al. |
| 2003/0110249 A1 | 6/2003 | Buus et al. |
| 2003/0144949 A1 | 7/2003 | Blanch |
| 2003/0167191 A1 | 9/2003 | Slabonik et al. |
| 2003/0172025 A1 | 9/2003 | Gallina |
| 2003/0177032 A1 | 9/2003 | Bonissone et al. |
| 2003/0182159 A1 | 9/2003 | Bonissone et al. |
| 2003/0187696 A1 | 10/2003 | Bonissone et al. |
| 2003/0187697 A1 | 10/2003 | Bonissone et al. |
| 2003/0187698 A1 | 10/2003 | Bonissone et al. |
| 2003/0187699 A1 | 10/2003 | Bonissone et al. |
| 2003/0187700 A1 | 10/2003 | Bonissone et al. |
| 2003/0187701 A1 | 10/2003 | Bonissone et al. |
| 2003/0187702 A1 | 10/2003 | Bonissone et al. |
| 2003/0208385 A1 | 11/2003 | Zander et al. |
| 2003/0212654 A1 | 11/2003 | Harper et al. |
| 2003/0217034 A1 | 11/2003 | Shutt |
| 2003/0220879 A1 | 11/2003 | Gaughan et al. |
| 2003/0225662 A1 | 12/2003 | Horan et al. |
| 2003/0229553 A1 | 12/2003 | Kongyingyong et al. |
| 2003/0229581 A1 | 12/2003 | Green et al. |
| 2003/0233260 A1 | 12/2003 | Snell et al. |
| 2003/0233316 A1 | 12/2003 | Hu et al. |
| 2004/0002915 A1 | 1/2004 | McDonald et al. |
| 2004/0019517 A1 | 1/2004 | Sennott |
| 2004/0030616 A1 | 2/2004 | Florance et al. |
| 2004/0030649 A1 | 2/2004 | Nelson et al. |
| 2004/0034592 A1 | 2/2004 | Hu et al. |
| 2004/0049439 A1 | 3/2004 | Johnston et al. |
| 2004/0049445 A1 | 3/2004 | Kishore |
| 2004/0059653 A1 | 3/2004 | Verkuylen et al. |
| 2004/0064402 A1 | 4/2004 | Dreyer et al. |
| 2004/0083164 A1 | 4/2004 | Schwartz et al. |
| 2004/0107161 A1 | 6/2004 | Tanaka et al. |
| 2004/0122717 A1 | 6/2004 | Hancock |
| 2004/0128230 A1 | 7/2004 | Oppenheimer et al. |
| 2004/0138996 A1 | 7/2004 | Bettenburg et al. |
| 2004/0215554 A1 | 10/2004 | Kemper et al. |
| 2004/0220873 A1 | 11/2004 | Nolan, III et al. |

| | | | |
|---|---|---|---|
| 2004/0220874 | A1 | 11/2004 | Singh et al. |
| 2004/0225584 | A1 | 11/2004 | Quinn et al. |
| 2004/0225594 | A1 | 11/2004 | Nolan, III et al. |
| 2004/0225595 | A1 | 11/2004 | Nolan, III |
| 2004/0225596 | A1 | 11/2004 | Kemper et al. |
| 2004/0225597 | A1 | 11/2004 | Oppenheimer et al. |
| 2005/0080722 | A1 | 4/2005 | Kemper et al. |
| 2005/0102225 | A1 | 5/2005 | Oppenheimer et al. |
| 2005/0102226 | A1 | 5/2005 | Oppenheimer et al. |
| 2005/0102229 | A1 | 5/2005 | Kemper et al. |
| 2006/0074793 | A1 | 4/2006 | Hibbert et al. |
| 2007/0016520 | A1 | 1/2007 | Gang et al. |
| 2008/0120211 | A1 | 5/2008 | Oppenheimer et al. |
| 2009/0076973 | A1 | 3/2009 | Kemper et al. |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |
| WO | WO 9948036 | 9/1999 |
| WO | WO 0021011 | 4/2000 |
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

OTHER PUBLICATIONS

Correction: Fitch Rts $288MM JEA Water & Sewer Sys VRBs 'AA/F1='. Business Wire. New York: Dec. 18, 2001. p. 1.*

Edmonds, Wakeen. Take That to the Bank. Black Enterprise. New York: Feb. 2001. vol. 31, Iss. 7; p. 50.*

The International Search Report, based on PCT/US03/37176, date of mailing of the International Search Report, Dec. 20, 2004, (4 pages).

U.S. Appl. No. 10/330,346, filed Dec. 30, 2002, Kemper et al.

Fannie Mae, "Servicing Guide", 1995-2002 et al, 318 pages, Forward, Table of Contents, Sections III, IX, X, and XI, Fannie Mae, USA.

Fannie Mae, "Selling", 1995-2002 et al, 1119 pgs, Fannie Mae, USA.

Fannie Mae, "Guide to Underwriting with Desktop Underwriter®", Sep. 2002; 63 pgs.

EDOCS, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, "E-Commerce Holds Keys to Home Ownership: Fannie Mae drives hug volumes of mortgage business to its e-marketplace," Internetweek.com, Undated, 5 pgs., Internetweek.com, USA.

Smith Tom, "Fannie Mae Ramps up Web Apps: Q&A with Julie St. John, Executive Vice President and Chief Technology Office and Michael Williams President of Fannie Mae e-Business," Internetweek.com, Undated, 11 pgs., Internetweek.com, USA.

SUN, "Success on Sun: Software Development Case Study Federal National Mortgage Association (Fannie Mae)," Mar. 1995, 10 pgs, Sun, USA.

Raines Franklin D., "Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1-5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "Mornet MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "Mornet Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "Mornet Manager User's Guide", Nov. 1998, 187 pages, Version 3.0, Fannie Mae, Washington, DC, USA.

Fannie Mae, "Mornet Servicing Support System User's Guide", Dec. 1998, 370 pages, Fannie Mae, Washington, DC, USA.

Fannie Mae, "Selling", Jun. 30, 2002, 168 pgs, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 188 pages, Fannie Mae, USA.

Laser Overview, May 1993, chapters 1-18.

* cited by examiner

SYSTEM AND METHOD FOR PROCESSING DATA PERTAINING TO FINANCIAL ASSETS

BACKGROUND OF THE INVENTION

1. Field of the Invention

This invention relates to computer systems and methods used to process data pertaining to financial assets, such as loans, securities, and so on.

2. Description of Related Art

The introduction of the mortgage backed security (MBS) has made the dream of owning a home possible for a much larger number of individuals. Frequently, when a borrower takes out a loan to purchase a home, that loan is subsequently pooled with other loans and used to create an MBS. The MBS is an investment instrument that can be sold to investors on Wall Street. Upon sale of the MBS, lenders can turn around and make new loans using proceeds from the sale. In effect, the MBS is a way for Wall Street to provide capital for loans to fund home ownership. The increased availability of capital reduces interest rates as compared to the interest rates that would otherwise be available, and therefore makes home ownership more affordable for an increased number of individuals.

While the mortgage backed security approach has worked exceptionally well, home ownership rates could be further improved if loans could be used to create new forms of mortgage backed securities and/or other types of investment instruments or other assets that more optimally align with investor needs. A more optimal alignment would result in further increases in the availability of capital, further reductions in interest rates, and ultimately increased home ownership rates.

In addition to providing new types of investment instruments, it is also desirable to provide new types of loan products. Different borrowers are in different financial situations and have different financial needs. Providing new types of loan products to meet these needs is a further way of increasing home ownership rates. Some of these new loan products may not coincide with the current structure for mortgage backed securities. Often, users of the current structure must balance between the interests of borrowers and the interests of investors. A more flexible structure for the creation and maintenance of mortgage backed securities is needed.

Efforts to offer new types of investment instruments and new types of loan products have been hampered by the fact that current data processing systems for processing loan information (including information on both the borrower side and on the investor side of the process) are not sufficiently efficient and flexible. Modifying the data processing system to support a new type of loan product or a new type of investment instrument is very difficult and expensive. In many cases, inherent limitations in the architecture of such data processing systems make certain types of new loan products or new investment instruments impossible to offer as a practical matter.

Therefore, a need exists for computer systems and methods that are capable of providing increased flexibility in processing data pertaining to financial instruments and other financial assets.

SUMMARY OF THE INVENTION

According to a first preferred embodiment, a data processing system comprises acquisition logic, reporting logic, and securitization logic. The acquisition logic is configured to receive information pertaining to loan term, interest rate, principal owed and other parameters for a plurality of loans. The reporting logic is configured to receive payment information regarding borrower payments in connection with the plurality of loans. The securitization logic is configured to facilitate creation and maintenance of a plurality of financial instruments backed by the plurality of loans. The acquisition logic, the reporting logic, and the securitization logic are provided on a common integrated data processing platform.

According to a second preferred embodiment a data processing system for processing loan information comprises acquisition logic, reporting logic, securitization logic, and a rules engine. The acquisition logic is configured to receive acquisition information pertaining to loan term, interest rate, principal owed and other parameters for a plurality of loans. The reporting logic is configured to receive payment reporting information regarding borrower payments in connection with the plurality of loans. The securitization logic is configured to facilitate creation and maintenance of a plurality of financial instruments backed by the plurality of loans. The creation and maintenance of the plurality of financial instruments results in the generation of investment information. The loan information that is processed by the data processing system includes the acquisition information, the reporting information, and the investment information. The rules engine comprises a series of business rules and processes the loan information by applying the business rules to the loan information.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Figure 1:
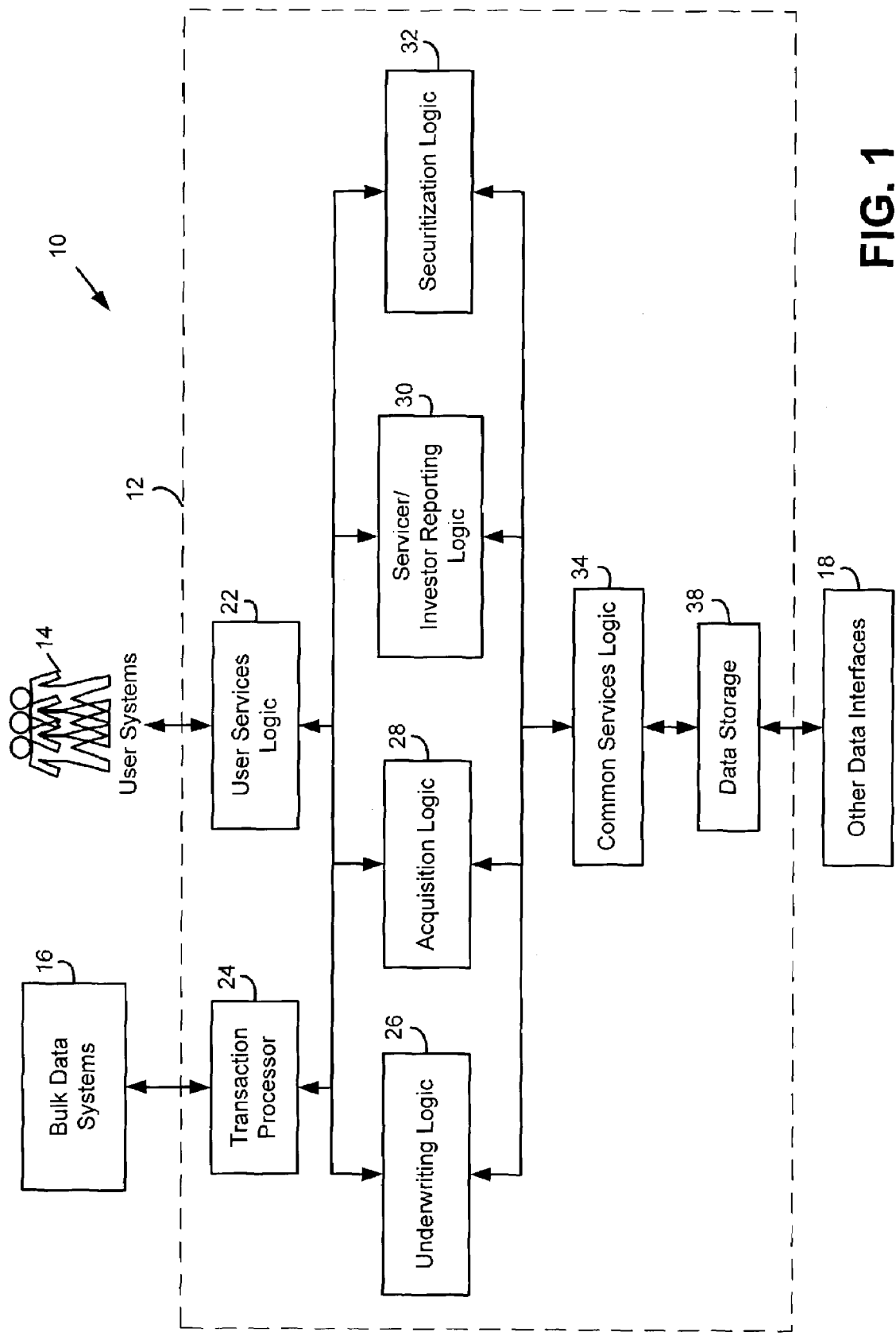
FIG. 1 is a block diagram of a data processing system according to one preferred embodiment.

Referring now to FIG. 1, a computer system 10 for processing data pertaining to financial assets is shown. As shown in FIG. 1, the system 10 comprises a data processing system 12, user systems 14, bulk data systems 16, and other data interfaces 18. The data processing system 12 further comprises user services logic 22, a transaction exchange processor 24, underwriting logic 26, acquisition logic 28, servicer and investor reporting logic 30, securitization logic 32, common services logic 34, a data storage system 38, and other data interfaces 36. Herein, although the term "logic" is used in connection with some blocks and the term "processor" is used in connection with other blocks, these two terms are used interchangeably. The term "processor" is used in the generic sense and is not meant to imply a separate discrete unit of processing hardware.

The data processing system 12 is configured for processing data pertaining to financial assets, such as loans and securities. In one embodiment, the data processing system 12 is configured to be used by a participant in the secondary mortgage market. Herein, for convenience, the participant is referred to as a "purchaser," although it should be understood that the purchaser may participate in the secondary market in other, different, or additional ways (e.g., as a loan guarantor, as a loan securitizer, and so on).

The data processing system 12 is preferably usable to support various types of transactions which may be executed by such a purchaser in connection with one or more loans. For example, the purchaser may purchase loans from lenders or other loan originators as part of a cash execution. The purchased loans may, for example, be held as investments in the purchaser's investment portfolio. Alternatively, the purchaser may create mortgage backed securities (MBS) as part of an MBS execution, or create other financial instruments or assets that are collaterallized by cash flows associated with individual loans, including both loans that have been purchased by the purchaser and other loans that have not been purchased by the purchaser. For example, in the case of MBS, the purchaser may acquire a pool of loans, securitize the pool of loans to create MBS that is then sold to investors, and hold the pool of loans in trust for the benefit of the investors. The purchaser may also receive a fee for guaranteeing to holders of MBS or other financial instruments the repayment of the loans by borrowers. The purchaser may also use loans to create other types of financial assets or instruments, for example, by purchasing loans and selling the financial instruments to investors, or by performing such services for other owners of loan assets.

The acquisition logic 28 is preferably usable to perform such operations as receiving information such as loan term, interest rate, principal owed and other parameters regarding loans when loans are first purchased or otherwise acquired and entered into the data processing system 12. In the case of cash executions, the acquisition logic 28 is also used to perform such operations as receiving commitments for the purchased loans.

The servicer and investor reporting logic 30 is used to process periodic loan data for loan accounting purposes and generate accounting output in connection with the purchased loans. Herein, the terms "reporting logic" and "servicer and investor reporting logic" are used interchangeably and both refer to logic that is configured to perform loan accounting and generate accounting output (e.g., for purposes of investor reporting, for purposes of managing a loan portfolio, and so on) in connection with a plurality of loans. The servicer and investor reporting logic 30 preferably performs such functions as receiving loan payment data on an ongoing basis from third party servicers. In this regard, it may be noted that the servicer and investor reporting logic 30 in the illustrated embodiment is not used for servicing loans directly but rather interfaces with a third party servicer. Of course, the servicer and investor reporting logic 30 could also be configured to include additional logic for servicing loans, either as part of the servicer and investor reporting logic 30 or as part of another functional block. The accounting output generated by the servicer and investor reporting logic 30 may include such things as accounting, tax, performance/valuation, and/or other relevant financial information for the loans retained in the portfolio or sold, in whole or in part.

The securitization logic 32 is used to generate financial assets. Herein, the terms "financial asset generation logic" and "securitization logic" are used interchangeably and refer to any logic that is used to generate/create financial assets. Herein, the term "financial asset" is used generically to refer to any asset that is backed by one or more cash flows, and includes such things as assets that are created entirely for internal data tracking purposes (e.g., in the case of packets which do not represent securities), as well as assets that have external significance (e.g., in the case of MBS or other security). The securitization logic 32 may be used to generate financial assets such as MBS or assets that are tracked internally in situations where the owner/operator of the data processing system 12 purchases a pool of loans and holds the loans as an investment in its own portfolio.

It will be appreciated that the data processing system 12 may perform fewer or additional functions as compared to those described herein. For example, an entity that performs only some of the above-mentioned processes may use a computer system that contains only a subset of the functions described herein. Herein, it will be assumed that the data processing system 12 is used to support each of the business processes described above.

Generally speaking, in the illustrated embodiment, there are three access points for external systems into the data processing system 12. Access can include data flow into and out of system 12. A first access point into the data processing system 12 is the user services logic 22 which provides entry to the user systems 14. A preferred implementation of the user services logic 22 is described in greater detail below in connection with FIG. 2. For purposes of explanation, the user systems 14 are assumed to be operated by human users that participate in some way in the above mentioned business processes. For example, the human user may be an employee of a lender or other loan originator that uploads loan information to the purchaser (or corrects, updates, and so on, information that has previously been provided) in connection with committing to deliver or actually delivering a group of loans to the purchaser, an employee of an owner of a portfolio of loans that uploads loan information in connection with a group of loans the owner wishes to have securitized by the purchaser, an employee of a servicer that uploads payment information regarding a group of loans serviced by the servicer, an employee of an institutional investor that downloads information regarding the financial performance or other data regarding investment instruments created and maintained by the purchaser, an employee of the purchaser itself, and so on.

A second access point into the data processing system 12 is the transaction exchange processor 24 which provides entry to the bulk data systems 16. The transaction exchange processor provides an alternative, bulk transfer mechanism for exchanging at least some of the transaction-related data mentioned above in connection with the user systems 14, typically without intervention of a human operator. Such bulk data transfers may occur with lenders, servicers, and so on. The transaction exchange processor 24 receives/sends transactions, and prescreens/sorts/translates data if needed, and makes the transactions/data available for further processing in the data processing system 12 or outbound transmission. A third access point into the data processing system 12 is through the data interfaces 18. The data interfaces 18 may be used to exchange other types of data between other computer systems and the data processing system 12. For example, the data interfaces 18 may be used to import or export data to other external computer systems (that is, computer systems not under the control of the purchaser) or other internal computer systems (e.g., computer systems that are under the control of the purchaser but that provide functionality that is not integrated into the data processing system 12).

The data processing system 12 is described in greater detail below in connection with FIGS. 2-5. As will become apparent from the discussion below, the preferred data processing system 12 exhibits a high level of data, service and time granularity. With respect to data granularity, the system 12 is capable of decomposing loans into a series of highly granular cash flows and tracking all of the cash flows from the point the cash flows enter the data processing system 12 (e.g., as part of a loan payment or other cash flow source) to the point the cash flows exit the data processing system 12 (e.g., as part of a payment on a financial instrument). The decomposition of a particular loan into sub-loan cash flows may occur when the loan is first acquired, later when servicing activity begins on the loan, or at another time. When loan payments are received, the allocation of the loan payment into individual cash flows may be performed by logic executed by the servicer, by the data processing system 12, or by other logic. Ideally, all or nearly all of the cash flow sources associated with a particular loan can be identified and tracked. Additionally, it is also possible to aggregate cash flows from a borrower perspective or other entity perspective. For example, a series of loans (e.g., all to the same borrower) may be aggregated into a higher order cash flow and then the aggregation of the loans may be decomposed. It is also possible to add cash flows to existing loans, for example, so that a new cash flow (e.g., for a new line of credit) may be established without having to set up a new loan. This provides additional flexibility to modify a borrower's loan over time. Thus, the data processing system 12 not only decomposes and maps cash flows associated with such things as principal and borrower paid interest, but also sub-loan level cash flows arising in association with the borrower paid interest or fees associated with the loan such as servicing fees, guarantee fees, mortgage insurance, prepayment penalties, borrower-paid fees, servicer advances, servicer recoveries, and loss/default components, and provides other flexibility. Additional description regarding exemplary possible sources of cash flows is provided at the end of this section. The decomposition and mapping of cash flows dramatically increases the number of different types of financial instruments that may be created, because it makes it possible to create financial instruments based on these other cash flows. In turn, this makes it possible to create financial instruments that are more optimally configured to meet the needs of the owner of the financial instrument.

With respect to service granularity, the data processing system 12 represents loans as a series of attributes and uses a business rules engine to process loan information. This dramatically simplifies the process of expanding the capabilities of the data processing system 12 to process data associated with any type of loan. The capability to process a new type of loan may be added by adding an additional attribute to a list of attributes corresponding to the new product feature (or modifying existing attributes), by using the attribute to indicate the presence or absence (and/or other characteristics) of the new feature in a particular loan, and by modifying the rules engine to incorporate additional rules regarding the new loan feature. It is not necessary to build a completely new data processing system for the new type of loan. This makes it easier to offer new types of loans which are more optimally configured to meet the needs of individual borrowers. An exemplary set of attributes is described at the end of this section.

With respect to time granularity, the data processing system 12 is capable of processing data using a much smaller time slice or update period than has been possible in the past. In the past, systems have typically been constructed around the assumption that servicers provide monthly reports which summarize loan activity that occurred during the previous month. The time slice for reporting has been one month and sub-monthly temporal data has been lost. In the data processing system 12, when information regarding new loans is received by the acquisition logic 28 and/or when information regarding loan payments is received by the servicer and investor reporting logic 30, this information preferably includes information regarding the date the loan was acquired, the date or dates within each month or other period other period on which a payment or other transaction is expected, and/or the date the payment was received. The time slice in the data processing system 12 is therefore one day (or less, if a smaller time slice such as AM/PM, hour, minutes, seconds, and so on, is used). The temporal information is stored and maintained in databases which are synchronized/commonly accessible by the acquisition logic 28, the servicer and investor reporting logic 30, and the securitization logic 32. As a result, the acquisition logic 28, the servicer and investor reporting logic 30, and the securitization logic 32 each have access to this highly granular temporal information regarding loan acquisitions and payments. The increased time granularity supports the above-mentioned capabilities to offer a wider array of loans to borrowers and a wider array of financial instruments to investors. For example, the increased time granularity facilitates offering loan products in which the borrower is expected to make bi-weekly payments, which may be attractive to borrowers that get paid bi-weekly instead of twice-monthly or monthly. This also facilitates handling loan products in which the date of a transaction is meaningful, such as daily simple interest loans. Further, because sub-loan cash flows can be processed using a one day time slice (or less), it is possible to create financial instruments based on cash flows that are processed on a per day basis.

Another benefit of the acquisition logic 28, the servicer and investor reporting logic 30, and the securitization logic 32 being provided on a common platform and having access to common/synchronized databases is that each system has an up to date view of the data. As previously indicated, the data processing system 12 has the ability to accept payment and other transaction information from a servicer as such transactions occur (e.g., using daily, hourly, or near real-time updates) instead of or in addition to receiving end of the month summary transaction information from the servicer. Once the data is received, it is accessible throughout the data processing system 12. For example, it is not necessary to limit the data updates for the securitization logic to a once-per-month basis at the end of a servicing cycle. Therefore, an up to date view of the data is available throughout the data processing system 12.

It should be apparent that it is also possible to construct data processing systems which do not incorporate the advantages described herein in connection with the data processing system 12, or which also incorporate additional advantages not described herein. Further, it may also be noted that the separation of functionality shown in FIGS. 1-4 is necessarily to some extent conceptual, and it is also possible to provide the same functionality in other ways. Additionally, although numerous functions are described below, it may be noted that it may be desirable to provide fewer, additional, or different functions in a given data processing system depending on the application and what is needed.

Figure 2:
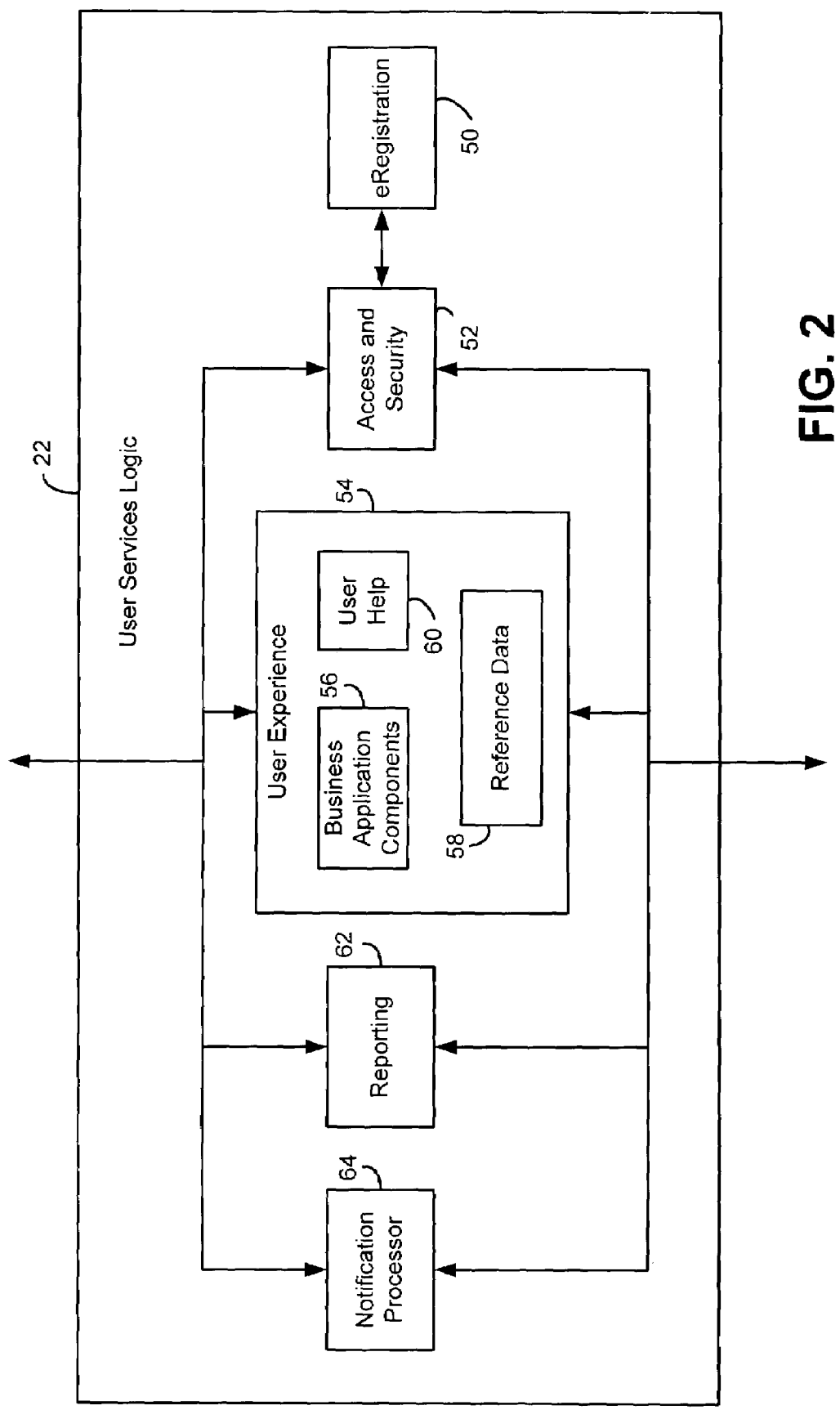
FIG. 2 is a block diagram showing user services logic of the system of FIG. 1 in greater detail.

Referring now to FIG. 2, a preferred implementation of the user services logic 22 and subcomponents thereof will now be described. The user services logic 22 includes electronic registration logic 50, access and security logic 52, user experience logic 54, report request processing logic 62, and a notification processor 64. The registration logic 50 is used to register individual users to be able to use the data processing system 12. For example, an employee of a lender may be given a login name and password to access the data processing system 12. User registration preferably includes providing each user with an authorization profile that defines the extent and type of access the user is given to the data processing system 12 and the types of operations that the user may perform while accessing the data processing system 12. The access and security logic 52 cooperates with the electronic registration logic 50 to permit users to access the data processing system 12 in the manner authorized.

The user experience logic 54 provides a user interface to the data processing system 12. Preferably, the user accesses the data processing system 12 through the Internet or an Intranet by using a personal/laptop computer or other suitable Internet-enabled device. For example, the data processing system 12 may be accessible to users by visiting the purchaser's web site (that is, the web site of the entity that owns/operates the data processing system 12, and that is assumed to be in the business of purchasing, guaranteeing, and/or securitizing loans) and clicking on appropriate links located at the web site. Depending on the authorizations the user has been given in the registration logic 50, the user is able to access different web pages of the web site relating to the underwriting logic 26, the acquisition logic 28, the servicer and investor reporting logic 30, and the securitization logic 32. For example, there may be one or more web pages relating to acquisitions that may be accessed by lenders, one or more pages relating to servicing that may be accessed by servicers, and so on. The user may then perform functions in accordance with what is permitted by the user's authorization profile (which, in turn, is typically based on the user's employer and the user's job function for that employer). For example, an employee of a lender may be given authorization to access web pages associated with the acquisition logic 28 and commit the lender to deliver a quantity of loans on a future date (i.e., to engage in a forward commitment with the purchaser). The types of operations that different users may perform is described in greater detail in connection with FIGS. 3A, 3B and 4 below.

The user experience logic 54 includes business application components 56, reference data 58, and user help logic 60. These components provide implementation support to the above-described user interface. The business application components 56 includes logic that assists directing the user to the correct web page. The reference data 58 may include data regarding user preferences for the appearance of web pages to the user. The reference data 58 may also provide general reference data and content that assists user interaction with the web site. The reference data 58 may also include data regarding particular lenders, such as the year the lender was first approved to do business with the purchaser, contact information for the lender, and performance information such as statistics and transfer history for the lender. The user help logic 60 provides other help or "How To" components.

The user services logic 22 also includes report request processing logic 62 and a notification processor 64. The report request processing logic 62 permits lenders and servicers to access the data processing system 12 and request reports generated from the data the lenders or servicers have provided the purchaser. The reports may be predefined "canned" reports, or may be ad hoc reports defined by the user by drilling down into the data and/or defining data filters. The type of reporting generation capability available may be made dependent on the type of user. The report request processing logic 62 may be used for incoming data in connection with lenders and servicers and/or for outgoing data in connection with investor reporting. Investor reporting may also be handled by other logic described below.

The notification processor 64 sends notifications/alerts to users. For example, the notification processor 64 may be used to send e-mail (or fax, automated telephone call, and so on) to a user associated with a servicer or lender indicating that data which has been submitted by the servicer or lender has been processed, and that the processed data is ready for review. The notification processor 64 is useful in the context of exceptions processing, when lender/servicer data is processed but the processing indicates that there may be an error in the lender's/servicer's data which requires review by a human operator.

Figure 3A:
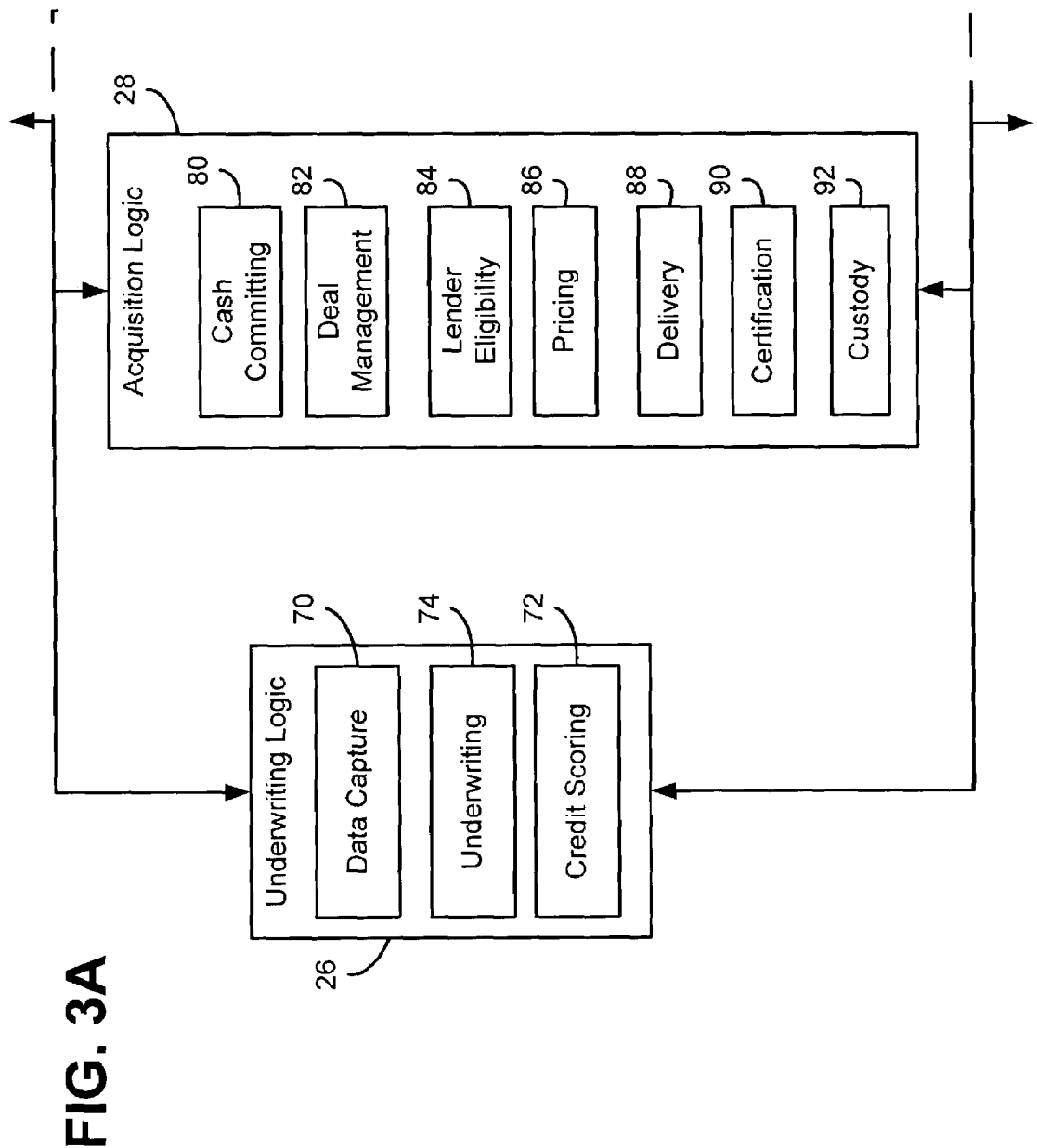
FIGS. 3A-3B are block diagrams showing underwriting logic, acquisition logic, servicer and investor reporting logic, and securitization logic of the system of FIG. 1 in greater detail.

Referring now to FIG. 3A, a preferred implementation of the underwriting logic 26 and subcomponents thereof will now be described. The underwriting logic 26 is typically accessed by users that originate loans, such as lenders and brokers. The underwriting logic 26 includes data capture logic 70, underwriting logic 74, and credit scoring logic 72. The data capture logic 70 is used to receive information to be used in loan underwriting and appraisal (e.g., information from a loan application and a credit report). Typically, the information that is received for loan underwriting is a subset of the information that would be provided on a loan application. The credit scoring logic 72 and the underwriting logic 74 cooperate to analyze the information to determine if the loan meets credit risk and eligibility requirements of the purchaser, and then issue a recommendation based on the assessment of the overall risk profile of the loan. The credit scoring logic 72 generates a credit score of the loan applicant based on the loan applicant's credit history. The underwriting logic 74 then combines the credit score with other information (e.g., debt-to-income ratios, appraisal value, income verification, borrower contribution, cash reserves of the borrower, the existence and amount of subordinate financing, and other factors) to determine whether to approve loan eligibility. The underwriting logic 26 may also be used to generate reports that provide information regarding the underwriting recommendation for a particular loan, information used in determining the recommendation (e.g., property, loan, and borrower information), and information summarizing key statistics from the credit report (e.g., borrower's open accounts, derogatory accounts, and undisclosed accounts).

Still referring to FIG. 3A, a preferred implementation of the acquisition logic 28 and subcomponents thereof will now be described. The acquisition logic 28 further includes cash committing logic 80, deal management logic 82, lender eligibility logic 84, pricing logic 86, delivery logic 88, certification logic 90, and custody logic 92.

The cash committing logic 80 provides a facility for performing all cash commitment functions. Typically, a master agreement/contract may be in place between the purchaser and the lender which defines overall terms of loan sales to the purchaser pursuant to particular commitments. A cash commitment is an agreement (typically, governed by the overall master agreement) in which the mortgage purchaser agrees to buy mortgages from mortgage sellers (e.g., lenders) in exchange for a specified price in cash. Typically, a cash commitment agreement specifies the type of mortgage(s) the seller plans to deliver, the amount of time the seller has to make delivery, the price the mortgage purchaser will pay the seller for the loan(s), other pertinent loan terms, and, in some cases, loan level details pertaining to the mortgage.

The cash committing logic 80 provides a central point for approved lenders (or other approved sellers) and the purchaser to perform all cash commitment functions. These functions may include, for example, making standard forward commitments, handling pair-off of commitments, extending commitments, over-delivering of a commitment, maintaining configurable parameters, updating contact information, updating commitment records, viewing and selecting from a seller's favorite product list, adding to and maintaining the seller's favorite product list, viewing contracts, fees, prices, price adjustments, and so on. As previously described, the access and security logic 52 verifies the identity of the user (using a login ID and password) and allows the user to gain access to the cash committing logic 80. Different types of users may be granted different levels of access to the cash commitment logic 80 (e.g., for different employees within a seller organization having different levels of authority to act on behalf of the seller).

In the preferred embodiment, the system 12 includes the ability to limit the different types of loans that a given seller may sell to a subset of the loans which the purchaser may purchase. The different products may comprise loans of different terms, different interest rates and types of interest rates (fixed or variable), as well as a variety of other features or combinations of features that may be offered in connection with the particular mortgage products. This information may be stored in the lender eligibility logic 84, described below, and the cash committing logic 80 may interface with the lender eligibility logic 84 to limit commitment activity to only those products that the seller is eligible to sell. During the committing process, the seller selects the type of product the seller plans to deliver from a list of eligible products. Sellers may be provided the ability to flag any eligible product as a "favorite," and are able to select products from a favorites list when making commitments. Preferably, sellers are also provided with the option to assign their own marketing name for each eligible product in the seller's favorites list. In another embodiment, rather than selecting from a list of eligible products, sellers may be provided the ability to define a product they plan to deliver by defining the loan attributes.

The committing logic 80 provides sellers with the option to apply a commitment to a master agreement. Information regarding master agreements is supplied by the deal management logic 82 and displayed in the cash committing logic 80 for a given seller. The display may, for example, indicate valid master agreement numbers, the unfulfilled commitment amount in dollars for each master agreement, the expiration date for each master agreement, and/or other pertinent information.

The deal management logic 82 is used to store and track terms of the deals/contracts made between sellers of loans and the purchaser. When a seller contacts the purchaser to initiate negotiation of a new deal, an employee or other representative of the purchaser uses the deal management logic 82 to create a master agreement, MBS pool contract and all the associated variances.

During the master agreement negotiation process, all terms and stipulations of the agreement are entered into the deal management logic 82. The deal management logic 82 enables authorized users creating or modifying variances to identify editable variances and facilitates transforming "codeable" variances into business rules in the delivery logic. The deal management logic 82 also facilitates communication of these variances to users responsible for analyzing them. Users responsible for analyzing variances are provided a link to the edit engine where they are able to add, modify, or delete edits based on their analyses.

The deal management logic 82 also integrates with the pricing logic 86 so that loan level price adjustments that reflect negotiated variances may be entered and displayed in the generated master agreement. The seller's specific adjustment tables (referencing master agreement and variance reference numbers) may also be stored in the deal management logic or, more preferably, in the lender eligibility logic 84.

The lender eligibility logic 84 is logic that maintains information regarding the eligibility of particular lenders to offer particular products made available by the purchaser. The lender eligibility logic 84 allows users (via web interface) to maintain and update product or lender-specific parameters in connection with the committing logic 80, the delivery logic 88, the certification logic 90, the custody logic 92, and the servicer and investor reporting logic 30.

The lender eligibility logic 84 may also be used to set pricing incentive adjustments, other price adjustments, fees and other parameters at the lender and product levels.

The pricing logic 86 is the logic used to generate pricing information and provide the pricing information to other logic in the data processing system 12, including the underwriting logic 26, the committing logic 80, the delivery logic 88, the certification logic 90, the custody logic 92, and the servicer and investor reporting logic 30. For example, the pricing logic 86 may be accessed during delivery to determine the price to be paid for a particular loan, or after the loan is delivered to determine how changes/corrections in loan information affect pricing. The pricing logic 86 takes into account pricing elements such as commitment/interest price (based on interest and the type of commitment), commitment calculations (e.g., for price adjustments associated with pair-offs, over delivery, extensions), and credit adjustment price (based on loan level credit risk). In addition to cash pricing (i.e., pricing in situations where the loan is paid in cash), the pricing logic 86 may also be used for MBS pricing (i.e., pricing in situations where the loan is paid for using a mortgage backed security). The pricing elements related to a MBS include the guarantee fee, the buy-up/buy-down amount, and the credit adjustment amount.

The pricing logic 86 interacts with the delivery logic 88 (described in greater detail below) when a seller is unable to fulfill the terms of its original commitment to generate price adjustments associated with pair-offs, over delivery, and extensions. The pricing logic 86 acquires delivery and under delivery tolerance amounts from the lender eligibility logic 84, processes data from a commitment inventory database to locate expired commitments and under deliveries, based on input from the delivery logic. The pricing logic 86 also processes data associated with the original commitment parameters to generate price adjustments. Additionally, price adjustments may also be assessed at the time of delivery for credit risk in connection with one or more loans that exceeds a pre-determined and agreed-upon level. In particular, at the time a cash commitment or MBS deal is made, a certain level of credit risk is assumed when determining the cash price or MBS guarantee fee. Later, when loans are actually delivered, the true risk level is identified. If the cash price or MBS guarantee fee does not account for this actual level of risk, a price adjustment is made. The system allows the option of selecting either an upfront loan level price adjustment at the time of delivery or a guarantee fee basis point adjustment to permit the payment to be made over time.

The pricing logic 86 also interacts with the servicer and investor reporting logic 30 when there are loan level changes during the servicing of the loan that result in a request for pricing. The servicing logic 28 sends the pertinent data attributes needed for pricing to the pricing logic 28 and the pricing logic 86 returns pricing information for the loan in question.

The pricing logic 86 may also be used to access prices set forth in pricing grids that store pricing information as a function of various loan parameters and/or features, e.g., interest rate and remaining term in connection with a particular seller. The pricing grids may be generated manually (e.g., in a spreadsheet which is provided to the pricing logic 86) or automatically. The pricing logic 86 may also be used to generate reports regarding pricing information.

The delivery logic 88 is the logic used to process loans when loans are delivered to the purchaser in connection with a purchase. The delivery logic 88 analyzes loan attributes, the associated deal/contract with the seller, and execution parameters to determine if the loan is acceptable for submission under the terms and conditions of the deal. The delivery logic 88 also invokes the pricing logic 86 to determine the price and/or price adjustments associated with accepting the loan. The delivery logic 88 also allows sellers to set up pools in cases where the loans are pooled in MBS.

The delivery logic 88 receives electronic loan data by way of the user services logic 22 or the transaction exchange processor 24. The purchaser will generally also receive paper loan documents that support the electronic loan data received by the data processing system 12.

The delivery logic 88 utilizes aspects of the underwriting logic 26, the deal management logic 82, and the pricing logic 86. Each loan that is delivered is checked against business rules and data format rules. Business rules are based on the product, pool/piece/contract, pricing, commitment, and other factors. For example, a seller may inadvertently try to deliver a 15-yr loan in connection with a commitment for 30-yr loans, and the business rules provide a mechanism for identifying that the 15-yr loan can not be used to satisfy that commitment. The delivery logic 88 uses the notification processor 64 to notify the seller when/if the data that is being delivered does not match the commitment. The delivery logic 88 also cooperates with the underwriting logic 26 to confirm that the loans that are being delivered meet underwriting criteria. Sellers are notified using the notification processor 64 when underwriting decisions for a particular loan is different than was anticipated based on the original (typically, incomplete or incorrect) loan data and there is an impact to the price that the seller will be charged. The pricing logic 86 is invoked to determine the change in price.

The delivery logic 88 allows the user to edit the delivery data for format/field edits and standard/custom edits necessary to deliver loans to the purchaser. Users have a real time view of updates to the delivery data in order to resolve data errors before the loan is purchased or securitized. For example, if the data indicates that a 15-yr loan is being used to satisfy a commitment for a 30-yr loan, the user may edit the data to indicate that the loan is a 30-yr loan (in a situation where the loan data was incorrectly entered and what was originally indicated as being a 15-yr loan is in fact a 30-yr loan). Alternatively, the user may edit the data to instead apply the 15-yr loan to a different commitment for a 15-yr loan. As a further alternative, the user may edit the data to substitute a 30-yr loan for the 15-yr loan. The delivery logic 88 also includes logic for address correction (detecting erroneous address information and correcting the address information) and geographic coding (to provide additional geographic information on the property, such as longitude and latitude, tract, congressional district, metropolitan statistical area number, and so on). By the end of the process, the delivery logic also generates a unique loan number for each of the loans for tracking purposes.

The certification logic 90 is logic that supports the process of ensuring that all loan documentation is complete and legally binding and that the paper documentation matches the electronic information delivered by the seller. The certification logic 90 generates, stores and makes available to other aspects of the data processing system 12 information pertaining to which loans have been certified. The certification logic 90 is also able to generate custom reports regarding certification data including reports on loans that have not been certified so that appropriate action may be taken (e.g., having the seller repurchase the loan). The certification logic 90 facilitates data modification and facilitates data matching when loans are redelivered or resubmitted. The certification logic 90 also generates reports to support management decisions with respect to certification activities.

The custody logic 92 is logic that is used to support the custody process, or the process whereby the purchaser stores the paper loan documents during the time from when the loans are purchased or securitized until they are released. Custody protects the physical evidence of investment in negotiable assets. The custody logic 92 manages custodial profile/contact information, custodian/seller relationships, and seller/servicer profile/eligibility information related to custody activities. The custody logic 92 also permits information to be retrieved regarding loan investors. If the market purchaser performs the custody function itself rather than having a third party act as custodian, the custody logic 92 also supports document management in connection with incoming and outgoing documents. In particular, the custody logic 92 tracks when loan documents are in the possession of the purchaser and otherwise manages and monitors the position of the physical loan documents. The custody logic 92 also manages and calculates fees charged for custodial and certification services.

The acquisition logic 28 may also include other logic in addition to the logic described above. For example, the acquisition logic 28 may further include payable/receivable manager logic to track the billing of price adjustments and fees generated by transactions in the committing logic 80, the pricing logic 86, the delivery logic 88, the custody logic 92, and certain aspects of the servicer and investor reporting logic 30. The payable/receivable manager logic may also be used to display the status (including payment status) of such price adjustments and fees in a consolidated manner.

Figure 3B:
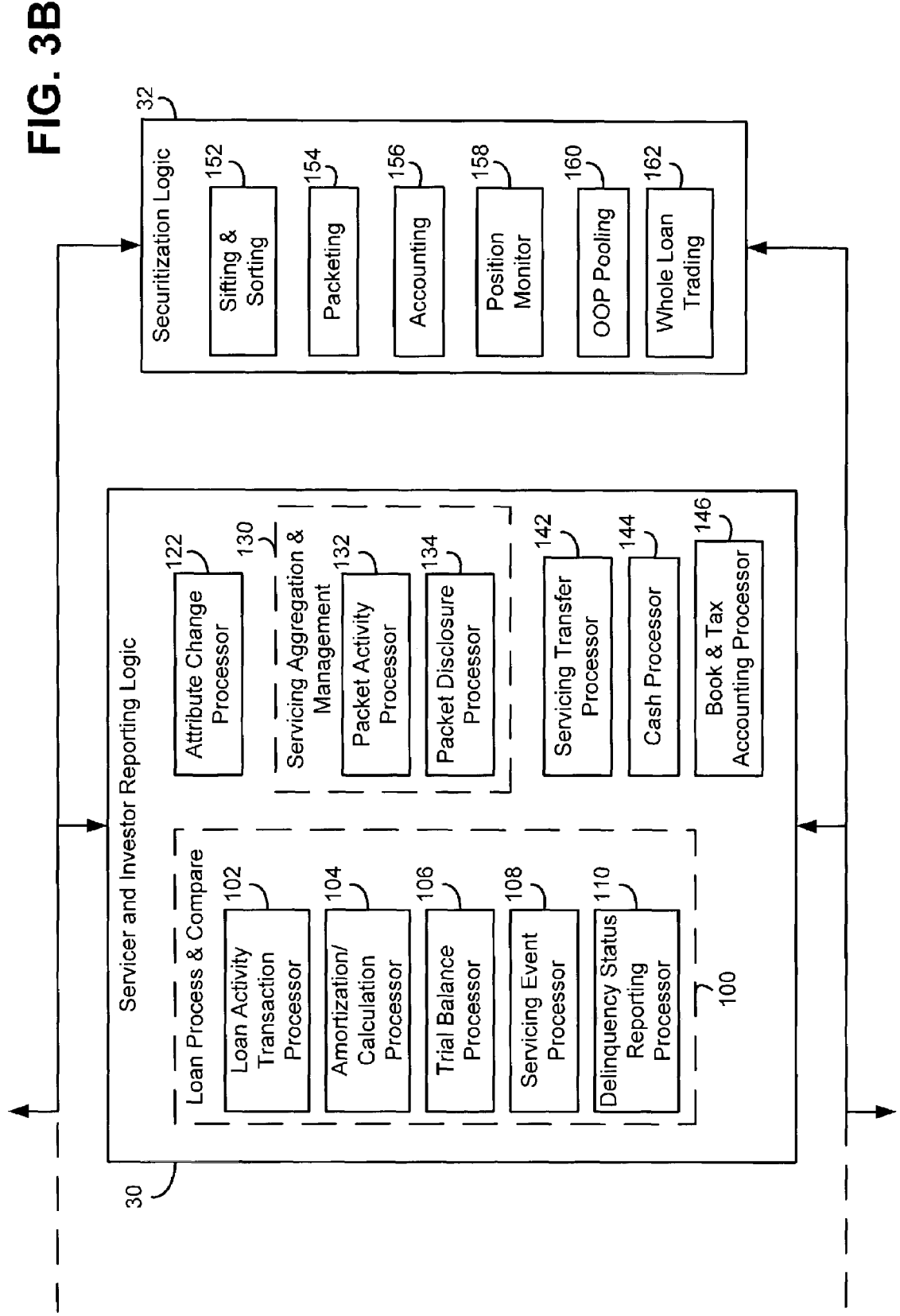

Referring now to FIG. 3B, a preferred implementation of the servicer and investor reporting logic 30 will now be described in greater detail. The servicer and investor reporting logic 30 includes loan process and compare (LPC) logic 100, which monitors and verifies the activities of third party mortgage servicers on an ongoing basis. Alternatively, if servicing is performed internally by the owner of the data processing system 12 and is included as part of the servicer and investor reporting logic 30 or as part of another functional block of the data processing system 12, the LPC logic 100 may be used to verify internally generated reporting information. Thus, the LPC logic 100 performs such operations as receiving and validating reporting information pertaining to loan activity, loan delinquency information and unpaid balance comparison reported by the servicer, updating the records of the data processing system 100 regarding the status of all reported loans, and determining the remittance and disbursement amounts that are expected for the loans.

As an initial matter, prior to loan servicing, a comparison is performed of the servicer's data for loans being serviced with the purchaser's data for the same loans. Even if the purchaser's data has already been compared with lender data for the same group of loans, the servicer's data may for some reason be different. Accordingly, the purchaser may provide a pre-defined set of acquisition data to the servicer that the servicer can compare with the servicer's data. At any time thereafter, the servicer may perform individual queries of the loan data stored on the purchasers data base via the user services logic 22 (web interface) and download the data for further comparison purposes. When exceptions are noted, the servicer can correct its data or submit a change request via the user interface to the attribute change processor (ACP) logic 122, described below.

During the life of the loan, when loan activity occurs (e.g., when the borrower makes loan payments), the LPC logic 100 is executed with regard to a particular loan when a servicer reports transactions to the purchaser. A loan activity processor 102 handles expected and scheduled servicing transactions including payments, rate changes, curtailments, and so on. The activity processor 102 receives and validates loan transaction data, such as loan activity, unpaid balance comparison, and delinquency status updates. The activity processor 102 also can be configured to check for duplicate transactions, validate servicer information, determine and validate the type of loan transaction, and validate that the loan activity is being reported in the correct reporting period. The activity processor 102 also confirms that changes in unpaid balance and last paid installment are correct, derives expected interest remittance, derives expected principal remittance, and compares the derived amounts to the reported remittance amounts. After validation, the status of the loan is made available to the servicer through the user services logic 22. The activity processor 102 also triggers the appropriate cash and accounting transactions in a book and tax accounting processor 146. When loan activity is processed and does not match the purchasers expectations based on rules and calculations, exceptions are noted and communicated to users using the notification processor 64.

The amortization/calculation processor 104 is used by the activity processor 102 to calculate loan level amounts, such as principal and interest due, servicing fees and other data pertinent to each loan. Processor 104 may additionally be used to compute derived or decomposed cash flows, such as a guaranty fee or a servicing fee. Business rules are used to identify scheduled and unscheduled principal, calculate fees, calculate remittance and disbursement amounts, calculate amounts to be disbursed to investors, amortization, and accruals. These calculations are used throughout the system 12 to perform functions such as collecting remittances from servicers, dispersing funds to investors and performing accounting activities. The results of processing are available through an interactive user interface to both personnel of the purchaser and personnel of the servicer for correction when transactions do not comply with business rules.

The trial balance processor 106 provides for validation of parameters such as servicer number, purchaser and servicers loan numbers, effective date, ending unpaid balance, note rate, pass through rate, principal and interest payment, last paid installment (LPI) date, pool number, accrued interest receivable balance, available line of credit, conversion date, reverse mortgage payment, net principal limit, taxes and insurance set asides, property charges set asides, repairs set asides, servicing fees set asides, scheduled payments, and so on. Any discrepancies are resolved and any system updates (loan attribute changes, data updates) are implemented. The LPC logic 100 then reprocesses the activity based on the corrected data.

In addition to borrower payments, the LPC logic 100 may also be triggered with regard to a particular loan when the attribute change processor (ACP) logic 122 makes a change to attributes that affect loan processing or when a loan attribute triggers processing, such as note rate changes, payment changes and loan reporting. The LPC logic 100 may also be triggered by borrower behavior (e.g., loan delinquencies status) at beginning and end of accounting periods.

The servicing event processor 108 identifies and handles business events that are not identified by the activity processor 102. Examples of these events include identifying delinquent loans and identifying loans that are eligible for reclassification or substitution. The delinquency status reporting processor 110 accepts delinquency reasons from the servicer for loans that have payments that are in arrears.

The attribute change processor (ACP) logic 122 processes loan or security level changes. The ACP logic 122 processes attribute changes regarding loans. As previously described, in the preferred embodiments, loans are characterized in the data processing system 12 by a series of attributes rather than by product codes. Each mortgage product that is purchased is then represented by a series of attributes instead of or in addition to an overall product code. New products may be created by creating new combinations of attributes, or by adding new attributes. An exemplary list of possible attributes that may be used is provided at the end of this section.

The ACP logic 122 processes attribute changes that occur after loans are brought into the data processing system 12. In particular, after loans are brought into the data processing system 12, the ACP logic 122 processes attribute changes that are unexpected or are unscheduled whereas the LPC logic 100 handles attribute changes that are both expected and scheduled. The ACP logic 122 also validates the attribute change request, assesses the financial impact of the change, updates the appropriate data and triggers the appropriate cash and accounting transactions.

Unexpected attribute changes are changes that are required due to new features or discrepancies between contract documentation and data captured by the acquisition logic 26, this can include changes to loan data and/or changes in loan behavior. Unscheduled attribute changes are changes that may occur based on contract documentation but the timeframe is unknown. For example, an unexpected attribute change would be a change for a daily simple interest cash loan that the purchaser has purchased without knowledge of a particular feature. After the purchase, the borrower exercises options under the feature and the servicer advances the next due date of the loan and submits a loan activity transaction record to the purchaser. Not knowing about the feature, the purchaser rejects the transaction since the loan record does not indicate the presence of the feature. After assessing the exception and evaluating the change, the servicer submits an attribute change request to add this feature and keep the loan in the purchaser's portfolio or in the security, pending confirmation of continued loan eligibility. An example of an unexpected and unscheduled attribute change would be the case where the lender submits an adjustable rate mortgage change request for a loan that the purchaser has set up as a fixed rate mortgage. The request is processed as an unscheduled change because the purchaser's systems have never had an event scheduled to trigger the change. An example of an unscheduled change is a fixed rate convertible loan which has the conversion option indicated in the terms of the note. It is anticipated that an attribute change will occur but the timing of the event is unknown and therefore unscheduled. The two primary types of unexpected attributed changes are post purchase adjustments (data corrections) and modifications (attribute changes driven by a number of business requirements, such as product flexibility, delinquency management, and substitutions/reclassifications).

In operation, the ACP logic 122 receives attribute change requests which indicate current database values for the loan and the proposed changes. The validation of the loan with the new values is then accomplished by applying the rules processor 180 to the ACP transaction. The business rules engine is applied to determine whether the changes are allowable and any failed business rules are provided to an operator for further review. Next, the original terms of the contract are used to determine any pricing adjustments of the attribute change. The system determines the difference between the current or adjusted price as applicable and the new price for the purchase adjustments. Next, a human operator reviews the requested change, the impact of the requested change, and any required hard copy documentation needed to justify the change. The operator/business analyst either approves or rejects the change. Rejected transactions may be modified and resubmitted. Approved adjustment transaction values are applied to the database and an audit trail history is maintained. If the result of the change request has an accounting impact, the ACP logic 122 also generates the appropriate transactions to trigger the accounting processor 146.

The ACP logic 122 also includes loan conversion request processing logic for handling loan conversion requests. Thus, when a loan conversion request is received, this logic tracks the request for the change, determines the allowability of the change based on business rules, and employs the remainder of the ACP logic 122 to make the change.

The securities aggregation and management (SAM) logic 130 receives the loan level cash flow information produced by the LPC logic 100 and aggregates this cash flow information to produce security level information. The security level information is produced at each of the following levels: remittance/express date level within each piece/single pool; single pool level or piece level within each major pool; pseudo pool (pool-like reporting group) level; major header level for each major pool; choice pool level; strip level; mega pool level; and mega in mega (MIM) pool level. In addition to securities, the SAM logic 130 is also capable of processing and managing any grouping of loans, cash flows from loans, and other financial instruments. Using a packet activity processor 132, the SAM logic 130 determines the loans in a given pool, aggregates cash flows based on the pool and loan level attributes for all the loans and then updates the system database. The packet activity processor 132 has the flexibility to aggregate loan level cash flows at the most granular level to security level enabling the SAM logic to also manage specific cash flow strips (e.g., access yield strips, interest only strips). At the end of appropriate processing periods, the SAM logic 130 finalizes the relevant security information. The SAM logic 130 then uses a packet disclosure processor 134 to make final remittance level principal and interest, guaranty fee, and other draft amounts available to a cash processing logic 144 and to make security accounting data available to a book and tax accounting logic 146. The SAM logic 130 also calculates, at the various MBS security levels, disclosure data for investors and the payment distribution to investors. The SAM logic 130 also includes packet modification request processing logic which is used to modify packets in generally the same manner that the attributes of loans are modified as described above in connection with the ACP logic 122. The operation of the SAM logic 130, and in particular packets and the packet activity processor 132, is described in greater detail in connection with the packeting logic 154.

Further, the SAM logic 130 can be used to facilitate the provision of real-time data updating. For example, investors may be supplied with real-time analytic data. The analytic data may include any data that allows investors to more accurately determine the value of their holdings, such as data concerning monthly loan payments, loan prepayments, loan pay-offs, and so on. For example, when a loan pays off, investors may be provided immediate access to this information rather than waiting until the next MBS reporting cycle.

Figure 4:
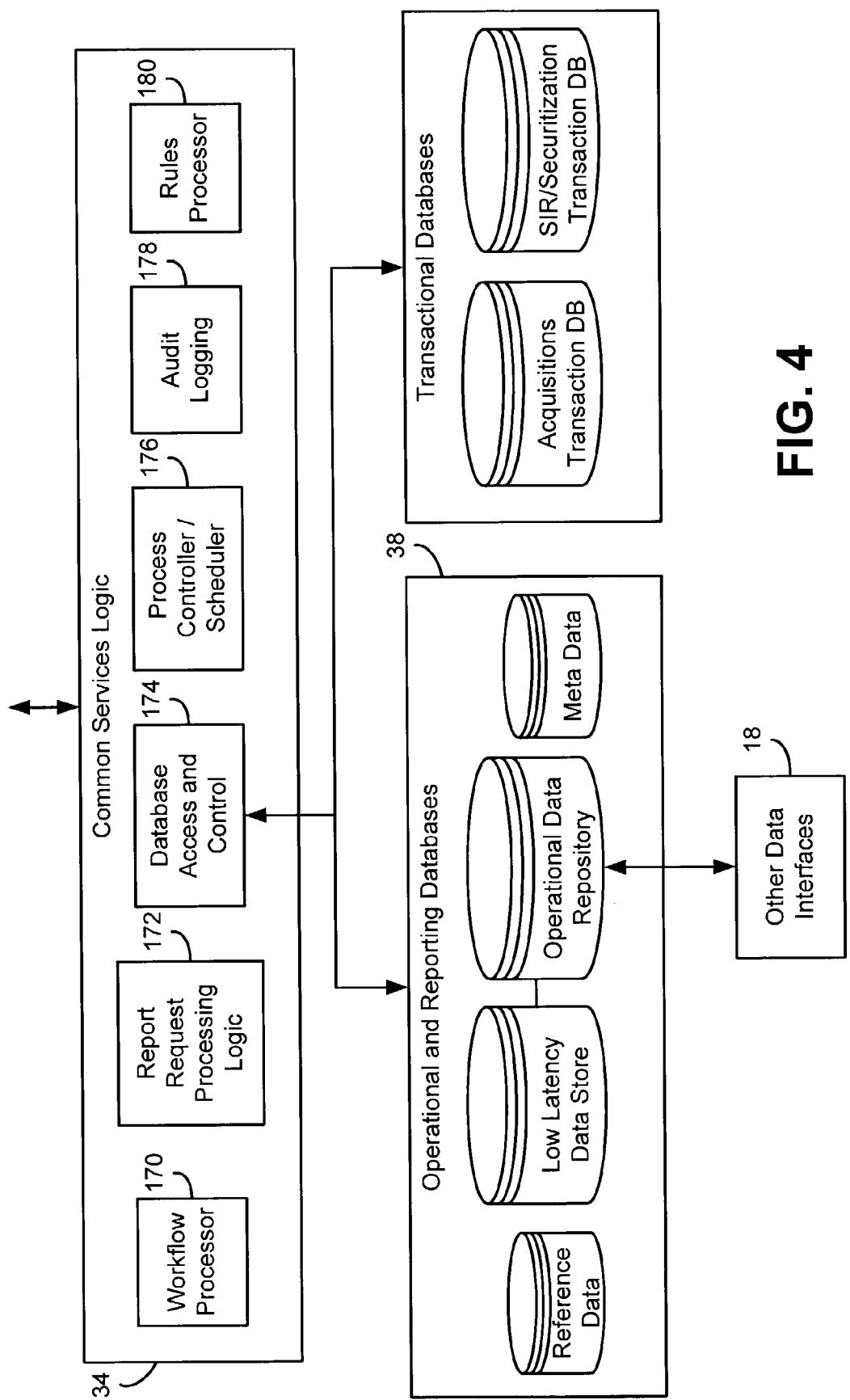
FIG. 4 is a block diagram showing common services logic of FIG. 1 in greater detail.

In the illustrated embodiment, the servicer and investor reporting logic 30 and the securitization logic 32 utilize the same data base (see FIG. 4). As a result, the data used by the securitization logic 32 is always synchronized with the data used by the servicer and investor reporting logic 30. Thus, it is not necessary for the securitization logic 32 to wait until the end of a periodic (e.g., monthly) reporting cycle to receive updated data, but rather the securitization logic 32 always has access to up-to-date loan information. In another embodiment, the servicer and investor reporting logic 30 and the securitization logic 32 may utilize different data bases that are synchronized on a weekly basis, on a daily basis, on a sub-daily basis, or in real time, depending on the frequency of update that is desired.

A servicing transfer logic 142 facilitates the process of transferring loans for the servicing rights of owned or securitized mortgages from one servicer to another or from one portfolio to another within the same servicer as of an effective date. A servicing transfer may be initiated, for example, if a servicer decides to stop servicing loans for business reasons, if a servicer decides to transfer a certain group of loans to another branch or portfolio, if a servicer is involved in a merger or acquisition of the servicer necessitating a transfer to the surviving entity, or for other reasons. The servicing logic 142 processes information regarding the old and new servicers and the loans that are subject to the change in servicing and updates loan record data for the respective affected loans. The effective date of the change in servicing is also specified. Information that is provided to the servicing transfer logic 142 as part of a servicing request includes the transferors servicer number, address and contact information, the transferees servicer number, address and contact information, unique loan numbers to be transferred, effective date, and other data. Additional steps, such as notifying the transferor of the termination and assessing transfer fees may also be performed.

The cash processor 144 provides a facility to allow servicers and other vendors to create and maintain bank account information. The accounts are bank accounts established with the purchaser to facilitate loan transactions. Servicers have the ability to create/select/update their account information in real time, including account numbers and remittance/disbursement information. The information captured in this process allows the cash processor 144 to create and execute Automated Clearing House (ACH) transactions. Historical records of servicers and vendors account and draft information is maintained to assist in resolving any issues that may arise.

Additionally, the cash processor 144 retrieves remittance and disbursement information from other areas of the data processing system 12. The remittance and disbursement information includes effective date, loan number, dollar amount, remittance code, and granular level details. The cash processor 144 performs a rollup of loan level details by servicer number as required. The cash processor 144 also performs a rollup of loan level details by seller number whenever the seller is not the designated servicer. The cash processor 144 triggers appropriate accounting transaction codes as needed that allow the book and tax accounting processor 146 to record applicable accounting entries.

Finally, the cash processor 144 creates cash transactions, for example, automated clearing house (ACH) transactions, outgoing check transactions, and so on. The cash processor 140 begins this process after the cash processor 144 has completed the process of assessing and validating remittance and disbursement data. The first step in creating a cash transaction is validating servicer/vendor bank account information. Ultimately, an ACH transaction is created that debits or credits the appropriate custodial bank account.

The book and tax accounting logic 146 manages accounting activities associated with the loans. The accounting logic 146 provides a consistent methodology for the recording of accounting events related to mortgage business activities across the acquisition logic 28 and the servicer and investor reporting logic 30 into subsidiary ledgers for posting to a general ledger. The book and tax accounting logic 146 supports the accounting activities related to the packaging of loan cash flows to the first level packet for the securitization logic 32. In addition, the book and tax accounting logic 146 supports the accounting activities related to forming securities or packets out of portfolio loan collateral. The investment accounting for securities held in portfolio and for the payment distribution on mortgage derivatives could also be handled by the book and tax accounting logic 146 or, preferably, is handled by separate accounting logic 156, described in greater detail below.

The book and tax accounting logic 146 journalizes mortgage related business activity, maintains subsidiary ledgers, provides audit trails, provides data integrity and control within the subsidiary ledgers, facilitates timely reconciliations, provides flexibility to account for new products or changes depending on actual accounting methodologies, and provides information needed to perform financial analysis. In one embodiment, the book and tax accounting logic 146 utilizes an accounting matrix which is a two-dimensional structure comprised of accounting "families" and "family members." The families are groups of accounting relevant transaction and loan attributes, and the family members are the allowable values for each of the groups. All intersections of families and family members have a debit and credit account number associated with each of the intersections. When the journal entry is created, the appropriate debit and credit account numbers are first assigned to each of the transactions as they are processed. The accounting matrix uses business rules processor 180 to automatically interpret the transactions. As new products are introduced, the accounting matrix is modified to incorporate new family and/or family members to properly record the new business activity. Similarly, as products become obsolete, or as the requirement for breaking out activity on the corporate general ledger becomes less detailed, the accounting matrix can be modified to adapt to those changes as well.

As business activities are processed, they are recorded/journalized in a subsidiary ledger according to the debit and credit account numbers assigned from the accounting matrix. This occurs by translating business activities into family and family member transactions that can be interpreted by the matrix. A subsidiary ledger provides the capability to view the lowest level of business activity that created the entry in the subsidiary ledger to maintain an audit trail for the subsidiary ledger activity. As activity is recorded, a system walk forward test of the subsidiary ledger balances is also performed to assure data integrity with the subsidiary ledger. At the end of accounting cycles, activity within the subsidiary ledgers is automatically summarized and posted to the general ledger.

At the end of the accounting cycle, reconciliation is performed between the subsidiary ledger activity and balances, and the general ledger activity and balances using an automated reconciliation tool. An automated reconciliation tool may be provided that generates the results of the reconciliation and, through a user interface, displays the results to an operator. Any reconciling items between the subsidiary and general ledgers may be analyzed and resolved by the operator. Through the operator interface, the operator updates the status of the reconciling items to indicate the results of the analysis. As reconciling items are resolved, the operator triggers the automated reconciliation facility to repeat the reconciliation and display the results.

The book and tax accounting logic 146 also provides information for financial and operational analysis. Information related to the status of the book and tax accounting logic is provided to operations through an accounting console. The accounting console is a management and operational workflow tool that includes notifications and status information related to the book and tax accounting processes. It also provides summarized reports and the ability to view the detailed information supporting those reports.

A preferred implementation of the securitization logic 32 and subcomponents thereof will now be described. The securitization logic 32 includes sifting/sorting logic 152 which accesses inventory, identifies collateral or asset attributes and sub-attributes, and categorizes data at its most granular level in both aggregating and segregating cash flows associated with mortgage assets. The sifting/sorting logic 152 provides a user interactive application that allows users to define selection criteria (loan and/or atomic characteristics), prioritize them, evaluate results, and make decisions about market transactions and their related economics. By sifting and sorting through available inventories, cash flows may be qualified and quantified for optimal aggregation of targeted transactions, given relative market value. The sifting/sorting logic 152 operates under a user maintainable library of business rules associated with mortgage instruments and respective cash flows. An auto sift function is also provided to allow to batch processing of predefined inventory types. For example, a daily auto sift may be executed against "available for sale" loans to aggregate and pre-packet the loans for future transactions.

The purpose of the sifting/sorting logic 152 is to provide a mechanism by which users can examine the entire collateral universe and pair down to smaller groupings of collateral or assets within the universe. Collateral refers to any cash flow derived from loans, pools, securities, commitments, and packets. The purpose of sorting is to group the subset of collateral identified in the sifting process and organize it by a single or multiple attributes to further refine the pool of candidate collateral to be placed into a potential packet. The sifting/sorting logic 152 supports the packeting logic 154, described below.

The packeting logic 154 is used to create, maintain, and otherwise support packets. A packet is an aggregation or packaging of cash flows that is treated as an entity separate and distinct from the incoming cash flows that support the packet and from the cash flows that result from the packet. Packets maintain the data integrity of the underlying assets as received by the LPC logic 102 and create an information chain that maps to a higher-order asset (e.g., an MBS or other financial instrument to be sold to an investor). The source data for packets may be loan-level or packet-level information, and the packets themselves may represent actual securities or just a unit of reporting and remittance.

Packets permit the data processing system 12 to enable and support new transactions by providing a platform for sourcing, normalizing, and centralizing cash flow-related data and building the linkages between loan assets and securities or non-securitized assets. Packets provide greater flexibility in the transformation of cash flows from the primary mortgage/loan level to the secondary market and within the secondary market. Packets provide the flexibility not only to create and sell securities to investors but also to support non-securitized forms of packaging to enable selling or retaining cash flows from individual loans. The ability to create and manipulate packets enables the creation of new types of financial instruments and new types of transactions within the secondary market.

Figure 5:
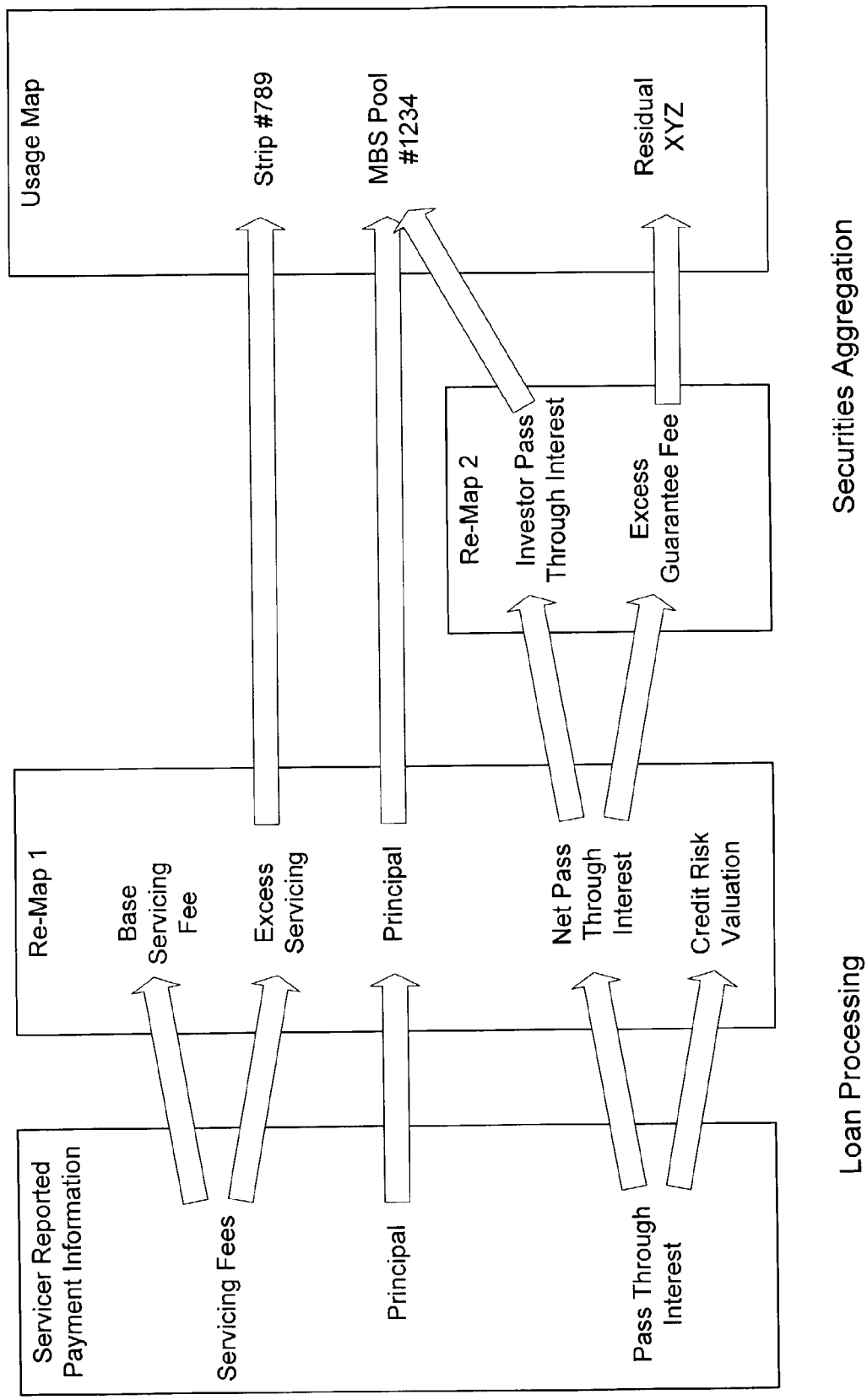
FIG. 5 is an exemplary data map used in connection with packeting logic in the system of FIG. 1.

FIG. 5 depicts a sample data map from a lender reported inbound record, through re-map, to packets. In the example of FIG. 5, a loan acquired on a cash basis has a portion of its cash flows re-mapped, and some of those cash flows participate in two packets, one an out-of-Portfolio MBS pool, the other an excess servicing fee strip. In this arrangement, the incoming data and cash flows is decoupled from the outgoing data and cash flows. This separation allows the timing and collection of cash flows from servicers to be treated independently from timing of payments to investors. This is useful in the case of structured transactions.

Packets preferably store the following four categories of data: packet header information (creation, purpose, and transaction information); cash flow and disclosure uses (data map); periodic process instructions and information; output requirements information. Thus, a packet stores information about its own attributes, the disposition of its cash flows, and any reported output, including disclosure data. Additionally, a packet stores information that describes its behavior, which may be derived from external business rules. These business rules may be standard (as in the case of MBS packets), or they may apply to a specific packet (as in the case of a structured transaction). Packet data fields may be added or changed to support new products.

In some cases, it may be necessary to apply data decomposition (or "internal re-mapping") to lender reported data. Some of the data decomposition steps may precede packet creation and rollup, converting loan level data reported by lenders into a form useful to downstream processes. In cases where the internal use of lender reported inbound data is differs from its use within a packet, data re-mapping is also required for roll-up.

The accounting logic 156 supports additional accounting functions for the securitization logic 32 that are not already supported by the book and tax accounting processor 146. In general, the book and tax accounting processor 146 is responsible for performing maintenance accounting at the loan level (i.e., posting transactions), while the accounting logic 156 is responsible for the accounting logic associated with transformative accounting events. Transformative accounting events include, for example, securitization events (in which a loan is to be construed to be sold). Other transformative events include a securitization event in which only a portion of the cash flows are sold, a sale event of a portfolio securities, and a sale event involving a whole loan. In addition, the accounting logic 156 is responsible for ongoing maintenance in connection with the reconciliation of securities cash payables. The accounting logic 156 performs such things as deriving the initial cost basis at the time of acquisition for every loan and inventory, maintaining the cost basis of each loan, tracking accounting intent for each loan, and performing market valuation for each loan. Of course, although the functionality of blocks 146 and 156 are shown as being conceptually separate, this functionality could also be combined.

The position monitor 158 allows monitoring of the purchaser's overall trade and investment position. Particularly, the position monitor 158 is an interactive tool that is usable to monitor positions of investors of whole loans and securities, and designate or redesignate inventory between trading accounts. The position monitor 158 is able to provide this information in near real time because the position monitor 158 either uses the same transactional database(s) as the servicer and investor reporting logic 30 and the securitization logic 132 or, preferably, uses a separate data base that is synchronized with these data bases. For both whole loans and securities, the position monitor 158 provides daily and month-to-date commitment/trade and delivery/settlement positions. The position monitor 158 also provides cumulative inventory positions held by the portfolio. The position monitor 158 allows investors to manage inventory from an economic, risk management, and regulatory accounting and taxation perspective. It also allows investors to determine or designate what assets to buy, what assets to sell, and what assets to retain or hold for investment. The portfolio manager 158 provides investors with a clear and concise view of their current net position of inventory.

The out of portfolio (OOP) pooling logic 160 permits the data processing system 12 to be used for pooling loans to create financial instruments in situations where the loans are owned by the entity that owns or operates the data processing system 12 or by an entity other than the entity that owns/operates the data processing system 12. The OOP pooling logic 160 provides the owner of the loans being pooled with the ability to select asset attributes and sub-attributes at a granular level, the ability to select loans to optimize chartered pool statistics, the ability to flexibly map incoming and outgoing cash flows, and the ability to use an on-screen display to manipulate collateral. The out of portfolio pooling processor 160 also has the ability to collateralize asset cash flows as described above in connection with the packeting logic 154.

The whole loan trading logic 162 provides a facility for engaging in whole loan trades to permit the owner or operator of the data processing system 12 to identify and sell loans out of its portfolio to other entities. The whole loan trading logic 162 also provides logic for reporting to the servicer of a sold loan (1) that the loan has been sold and (2) the identity of the new owner of the loan, allowing the servicer to begin reporting payment information to the new owner.

Referring to FIG. 4, the common services logic 34 includes work flow processor 170 which generates notifications about required actions and routes the notifications to users of the data processing system 12 according to pre-defined processing sequences for request approvals and exception report resolutions. The work flow processor 170 also keeps track of status and actions related to work items.

The report processor 172 generates reports based on users' requests. The report processor 172 allows data to be extracted from the data bases to prepare reports that can be sent out through the user services logic 22. The reports that are returned may be bulk transfers of data. The report processor 172 supports generating the reports described above in connection with the acquisition logic 28, the servicer and investor reporting logic 30, and the securitization logic 32.

The database and access control logic 174 provides database and user security administration and control for the databases in the data storage system 38 and functions available through system 12. The database access and control logic also maintains referential integrity, processes queries and updates, and performs all tasks related to access and control of the databases in the data storage system 38.

The process controller/scheduler 176 triggers execution of processes based on time schedule and/or events received from application components. The process controller/scheduler encapsulates information on processing interdependencies between different components in the data processing system 12.

The audit logging logic 178 logs data that is needed for historical tracking of the activities of the data processing system 12. The purpose of the data logging is primarily to meet audit requirements in connection with the transactions processed by the data processing system 12.

The business rules processor 180 is a rules engine that encapsulates business rules to permit the business rules to be applied to the loan data. Examples of the business rules applied by the rules processor 180 have been described throughout the discussion of the data processing system 12. A user interface is provided that allows the business rules to be modified and that allows new business rules to be added or obsolete business rules to be deleted. The rules processor 180 maintains the business rules separate from the remainder of the application code that implements other aspects of the data processing system 12. This allows the business rules to be modified/added/deleted without requiring revisions to the application code. The ability to modify or add business rules quickly facilitates the introduction of new types of loan products and investment instruments, because the data processing system 12 may be easily modified to implement any special data processing required for the implementation of the new loan products/investment instruments. Preferably, the rules processor 180 is provided as three separate rules processor, one for each of the acquisition logic 28, the servicer and investor reporting logic 30, and the securitization logic 32, with separate user interfaces for each rules processor.

As previously indicated, service granularity is achieved in part by representing loans as a series of data attributes. The following is an example of a set of attributes that may be used to characterize loans: accounting class code; accounting close effective period; accounting reporting category code; actual UPB at acquisition; adjusted last paid installment date; adjusted unpaid principal balance; ceiling; change frequency; change method; conduit code; custodian code; downward cap; downward cap code; effective date; excess yield; excess yield adjustment; extended term; purchaser loan number; final step change; first PITI (principal, interest, taxes, insurance) due date; fixed interest rate; fixed pass-thru rate; fixed payment amount; floor; frequency of payment change; frequency of rate change; future feature code; index code; index lookback; interest rate; loan guaranty payment date; loan conversion date; loan guaranty date; loan payoff interest calculation code; loan rate effective date; loan to value ratio; LP control record; lender pass through (LPT) type code; maximum term; months payment control effective; months rate control effective; mortgage margin; mortgage term; net interest adjustment; new payment amount; next control record; next scheduled payment change date; next scheduled rate change date; number of months in effect; other fees collected adjustment; pass-thru rate; payment change amount/percentage; payment change method code; payment control record; payment type code; principal adjustment; processing status code; product code; rate change method code; rate change percent; rate control record; rate conversion status code; rate rounding method; rate type code; reclassification date; remittance day code; required change index; required margin; secured unpaid principal balance; servicing fee; servicing fee adjustment; servicing fee type; servicing remittance option; unpaid principal balance; upward cap; upward cap code. In addition to the above-mentioned attributes, additional attributes may be used in connection with particular types of specialty loan products.

As previously indicated, data granularity is achieved at least in part by decomposing loan assets into a series of cash flows. A cash flow may be any type of payment, whether of principal, interest, or fees. Cash flow may also includes credit-related losses, which manifest themselves from the securities standpoint as negative investor payments (i.e., a reduction to positive cash flows). Possible sources of cash flow may be associated with principal, interest, servicing fees, guarantee fees, mortgage insurance, prepayment penalties, borrower-paid fees, servicer advances, servicer recoveries, loss/default components, and REO activity. For principal, individual cash flows that may be identified include the following: scheduled principal (amount payable based on scheduled amortization), actual principal (what was applied as principal), unscheduled principal (amount from borrower applied in excess of scheduled), advanced (amount not collected from borrower but remitted to investor), shortfall (underpayment from borrower, usually meaning less than full scheduled amount). For interest, individual cash flows that may be identified include the following: scheduled Interest (amount payable), actual (what was applied), excess (interest collection in excess of amount payable), advanced (not collected from borrower but sent to investor), shortfall (underpayment from servicer), capitalized (negative amortization), other capitalized interest (delinquency), unrecoverable prepayment interest shortfall. For servicing fees, individual cash flows that may be identified include the following: gross servicing fee, core servicing fee (usually relates to tax), excess servicing fee, safe harbor (tax). For guarantee fees, individual cash flows that may be identified include the following cash flows: gross guarantee fee (GF) (total charged to the lender), cash flows for internally tracking costs (e.g., costs associated with credit risk), base GF, GF variance, and other GF adjustments. For mortgage insurance (MI), individual cash flows that may be identified include the following: lender paid MI, borrower paid MI, portion of GF construed to be MI, back-end MI. For prepayment penalties, individual cash flows that may be identified include the following: prepayment penalty, prepayment penalty (borrower-paid), yield maintenance fee (borrower-paid). For borrower-paid fees, individual cash flows that may be identified include the following: borrower-paid fees, late payment fee, conversion/modification fee. For seller advances, individual cash flows that may be identified include the following: advanced principal, advanced interest, advanced guaranty fee, servicing advances (usually relates to defaults, e.g., T&I). For servicer recoveries, individual cash flows that may be identified include the following: recovered principal advances, recovered interest advances, recovered guaranty fee advances, recovered servicing advances. For default activity, cash flows that may be identified include the following: net realized loss (total amount payable to investors less all recoveries), foreclosure expenses, attorney fees, recoup of non-recoverable advances, loss due to modification, loss due to appraisal reduction, loss due to deficiency valuation, non-capitalized deferred interest (e.g. workout), interest paid on advances. For REO activity, cash flows that may be identified include the following: foreclosure sale proceeds, rental income, insurance proceeds, tax expenses on REO, repair expenses on REO, sale/marketing expenses on REO, REO property maintenance expenses. It may be noted that some of the above cash flows are aggregate cash flows that can be further decomposed. Other cash flow pertinent information that may be tracked includes unpaid principal balance (UPB) (including scheduled UPB and actual UPB), participation percentage (including principal participation percentage, interest participation percentage, and servicing fee participation (basis points)), discount rate (used to calculate yield maintenance or prepayment penalty), appraised balance, foreclosure sale date, and REO sale date.

Many other changes and modifications may be made to the present invention without departing from the spirit thereof. The scope of these and other changes will become apparent from the appended claims.

What is claimed is:

1. A computer-implemented data processing system for processing mortgage loans comprising:
    (A) a data storage system configured to store mortgage loan data, the mortgage loan data including acquisition information, payment reporting information, and investment information;
    (B) a hardware processor configured to retrieve the mortgage loan data from the data storage system, wherein the hardware processor is configured to execute
        (1) acquisition logic, the acquisition logic including logic configured to receive the acquisition information pertaining to loan term, interest rate, principal owed and other parameters for a plurality of mortgage loans, the acquisition logic being configured to store the acquisition information in the data storage system, the acquisition logic including
            (a) committing logic configured to permit a seller of the plurality of mortgage loans to enter into a commitment to sell the plurality of mortgage loans,
            (b) pricing logic configured to determine selling prices for the plurality of mortgage loans based on the acquisition information, and
            (c) deal management logic configured to track terms of deals entered into with the seller of the plurality of mortgage loans based on the acquisition information;
        (2) reporting logic, the reporting logic including logic configured to receive the payment reporting information regarding borrower payments in connection with the plurality of mortgage loans, the reporting information being received on an ongoing basis throughout at least a portion of a term of each the plurality of mortgage loans, the reporting logic being configured to store the reporting information in the data storage system, and the reporting logic including
            (a) comparison logic configured to calculate expected payment reporting information pertaining to the plurality of mortgage loans and to compare the expected payment reporting information with the received payment information, the expected payment reporting information being calculated based on the acquisition information,
            (b) accounting logic configured to generate accounting records reflecting the received payment information, and
            (c) aggregation logic configured to aggregate cash flows from the plurality of mortgage loans to generate payment information for the plurality of financial assets;
        (3) financial asset generation logic, the financial asset generation logic including logic configured to facilitate creation and maintenance of a plurality of financial assets backed by the plurality of mortgage loans based on the acquisition information, the creation and maintenance of the plurality of financial assets resulting in the generation of the investment information, the financial asset generation logic being configured to store the investment information in the data storage system;
        (4) a rules engine, the rules engine comprising a series of business rules, the rules engine applying the business rules to at least one of the acquisition information, the payment reporting information, and the investment information; and wherein the acquisition logic, the reporting logic, and the financial asset generation logic are provided on a common integrated data processing platform; and
    wherein the data storage system comprises a first data base accessible to the reporting logic and a second data base accessible to the financial asset generation logic, and wherein the first and second data bases are synchronized on a periodic basis.

2. A data processing system according to claim 1, wherein the first and second data bases are synchronized on at least approximately a weekly basis.

3. A data processing system according to claim 1, wherein the first and second data bases are synchronized on at least approximately a daily basis.

4. A data processing system according to claim 1, wherein each of the plurality of mortgage loans is described using a series of attributes, and wherein the data processing system is capable of being modified to process mortgage loan information for new types of mortgage loans by modifying the composition of the series of attributes.

5. A data processing system according to claim 1, wherein the data processing system decomposes the plurality of mortgage loans into a plurality of assets represented by a plurality of cash flows, the plurality of cash flows includes a plurality of cash flows pertaining to principal payments, a plurality of cash flows pertaining to interest payments, a plurality of cash flows pertaining to servicing fees, and a plurality of cash flows relating to other borrower payments.

6. A data processing system according to claim 5, wherein the data processing system includes a cash flow mapping system, the cash flow mapping system permitting outgoing cash flows associated with the plurality of financial assets to be traced back to individual cash flows associated with specific ones of the plurality of mortgage loans.

7. A data processing system according to claim 6, wherein the plurality of financial assets generated by the financial asset generation logic includes a packet used by the cash flow mapping system.

8. A data processing mortgage system according to claim 5, wherein the data processing system decomposes each loan such that the plurality of cash flows represent substantially all possible sources of cash flow associated with the plurality of mortgage loans.

9. A data processing system according to claim 5, wherein the plurality of cash flows include negative cash flows.

10. A data processing system according to claim 1, wherein the plurality of financial assets generated by the financial asset generation logic includes a mortgage backed security backed by the plurality of mortgage loans.

11. A data processing system according to claim 10, wherein the investment information includes financial performance information regarding the mortgage backed security.

12. A data processing system according to claim 11, wherein the data processing system includes logic configured to determine a guarantee fee, the guarantee fee being a fee for guaranteeing timely payment of the plurality of mortgage loans that back the mortgage backed security.

13. A data processing system according to claim 1, wherein the reporting logic is configured to receive the information regarding borrower payments on a sub-monthly basis.

14. A data processing system according to claim 1, wherein the reporting logic is configured to receive the information regarding borrower payments on approximately a daily basis.

15. A data processing system according to claim 1, wherein the reporting logic is configured to receive the information regarding borrower payments in approximately real time.

16. A computer-implemented data processing system for facilitating the processing of mortgage loans, comprising:

(A) a data storage system configured to store mortgage loan data, the mortgage loan data including acquisition information, payment reporting information, and investment information;

(B) a hardware processor configured to retrieve the mortgage loan data from the data storage system, wherein the hardware processor is configured to execute (1) underwriting logic, the underwriting logic including logic for determining mortgage loan eligibility requirements of a purchaser of the mortgage loans and generating an underwriting recommendation for the mortgage loans, the underwriting logic including:

(a) data capture logic configured to receive at least some of the mortgage loan data in the form of underwriting data for each of the mortgage loans to be processed by the underwriting logic and to store the underwriting data in the data storage system; and (b) credit scoring logic configured to generate a credit score for a mortgage loan applicant for each of the mortgage loans based at least on the credit history of the applicant for the mortgage loan;

(2) acquisition logic, the acquisition logic including logic configured to receive the acquisition information, the acquisition information pertaining to mortgage loan term, interest rate, principal owed and other parameters for the mortgage loans, the acquisition logic being configured to store the acquisition information in the data storage system, the acquisition logic including (a) committing logic configured to manage cash commitment agreements between sellers and purchasers of the mortgage loans, the cash commitment agreements specifying at least a type of mortgage loan, an amount of time to make delivery of the mortgage loans, and a price a purchaser will pay for the mortgage loans;

(b) lender eligibility logic configured to
store information regarding the eligibility of particular sellers to sell the mortgage loans in the data storage system; and
permit users to edit product-specific and seller-specific parameters related to the eligibility of particular sellers to sell the mortgage loans;

(c) pricing logic configured to generate pricing information related to the mortgage loans based on the acquisition information, the pricing information including
prices for the mortgage loans; and
prices for mortgage-backed securities backed by the mortgage loans;

(d) delivery logic configured to process the mortgage loans when the mortgage loans are delivered to purchasers by applying a set of business rules to the mortgage loan data for each of the mortgage loans to determine compliance of the mortgage loan data with an agreement between the seller and the purchaser regarding the sale of the mortgage loans, the delivery logic further configured to permit users to edit the mortgage loan data in the data storage system for the mortgage loans;

(e) certification logic configured to determine whether documentation for each of the mortgage loans is complete and the mortgage loan is ready to be delivered to the purchaser; and (f) custody logic configured to track and store information regarding the location and travel of physical mortgage loan documentation for each of the mortgage loans;

(3) reporting logic, the reporting logic including logic configured to receive payment reporting information regarding borrower payments in connection with the mortgage loans, the reporting information being received on an ongoing basis throughout at least a portion of a term of each of the mortgage loans the reporting logic being configured to store the reporting information in the data storage system, and the reporting logic including:

(a) loan process and compare logic configured to monitor and validate the mortgage loan data regarding the mortgage loans as used by servicers of the mortgage loans;

(b) attribute change processor logic for processing changes to mortgage loan attributes required as a result of at least one of
the identification of new mortgage loan attributes; and
the identification of discrepancies between an agreement between the seller and the purchaser regarding the sale of the mortgage loans and the mortgage loan data captured by the acquisition logic;

(c) servicer transfer logic configured to receive and store information in the data storage system regarding changes in a mortgage loan servicer for at least one of the mortgage loans;

(d) cash processor logic configured to permit mortgage loan servicers to establish and maintain bank accounts with the purchaser and to perform automated cash transactions regarding the mortgage loans; and (e) accounting logic configured to generate accounting records related to the mortgage loans including received payment information and to store the accounting records in the data storage system; and (4) securitization logic, the securitization logic being configured to facilitate the creation and maintenance of financial assets backed by the mortgage loans, the securitization logic being configured to generate the investment information regarding the financial assets and to store the investment information in the data storage system, the securitization logic including (a) sifting and sorting logic configured to sort and/or aggregate cash flows from the mortgage loans according to cash flow attributes;

(b) packeting logic for storing information in the data storage system regarding aggregated cash flows, including the sources of the individual cash flows that make up the aggregated cash flows;

(c) position monitor logic configured to provide the purchaser with investment position information regarding the mortgage loans and securities;

(d) pooling logic configured to permit pooling of the mortgage loans based on attributes of the mortgage loans, wherein cash flows associated with the mortgage loans are pooled based upon cash flow attributes; and (e) whole loan trading logic configured to
permit the operator of the data processing system to sell at least one of the mortgage loans to another entity; and
report to the servicer of a sold mortgage loan that the mortgage loan has been sold and identify the new owner of the mortgage loan.

17. A data processing system according to claim 16, wherein the data storage system includes at least two data bases, the data storage system being accessible to the acquisition logic, the reporting logic, and the financial asset generation logic, and wherein the at least two data bases are accessible by different portions of the acquisition logic, the reporting logic, and the financial asset generation logic.

18. A data processing system according to claim 17, wherein the at least two data bases are synchronized on at least approximately a weekly basis.

19. A data processing system according to claim 17, wherein the at least two data bases are synchronized on at least approximately a daily basis.

20. A data processing system according to claim 16, wherein each of the mortgage loans is described using a series of attributes, and wherein the data processing system is capable of being modified to process loan information for new types of loans by modifying the composition of the series of attributes.

21. A data processing system according to claim 16, wherein the data processing system decomposes the mortgage loans into the financial assets represented by a plurality of cash flows, the plurality of cash flows includes a plurality of cash flows pertaining to principal payments, a plurality of cash flows pertaining to interest payments, a plurality of cash flows pertaining to servicing fees, and a plurality of cash flows relating to other borrower payments.

22. A data processing system according to claim 21, wherein the data processing system includes a cash flow mapping system, the cash flow mapping system permitting outgoing cash flows associated with the financial assets to be traced back to individual cash flows associated with specific ones of the mortgage loans.

23. A data processing system according to claim 22, wherein the financial assets generated by the securitization logic includes a packet used by the cash flow mapping system.

24. A data processing system according to claim 21, wherein the data processing system decomposes each of the mortgage loans such that the plurality of cash flows represent substantially all possible sources of cash flow associated with the plurality of loans.

25. A data processing system according to claim 21, wherein the plurality of cash flows include negative cash flows.

26. A data processing system according to claim 16, wherein the financial assets generated by the financial asset generation logic includes a mortgage backed security backed by the mortgage loans.

27. A data processing system according to claim 26, wherein the investment information includes financial performance information regarding the mortgage backed security.

28. A data processing system according to claim 27, wherein the data processing system includes logic configured to determine a guarantee fee, the guarantee fee being a fee for guaranteeing timely payment of the mortgage loans that back the mortgage backed security.

29. A data processing system according to claim 16, wherein the securitization logic includes a portfolio monitor, the portfolio monitor being capable of monitoring financial performance of the mortgage loans in substantially real time as the information regarding borrower payments is received.

30. A data processing system according to claim 16, wherein the reporting logic is configured to receive the information regarding borrower payments on a sub-monthly basis.

31. A data processing system according to claim 16, wherein the reporting logic is configured to receive the information regarding borrower payments on approximately a daily basis.

32. A data processing system according to claim 16, wherein the reporting logic is configured to receive the information regarding borrower payments in approximately real time.

* * * * *

UNITED STATES PATENT AND TRADEMARK OFFICE
CERTIFICATE OF CORRECTION

PATENT NO. : 7,593,889 B2  Page 1 of 1
APPLICATION NO. : 10/331811
DATED : September 22, 2009
INVENTOR(S) : Raines et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 1400 days.

Delete the phrase "by 1400 days" and insert -- by 2021 days --

Signed and Sealed this

Eighteenth Day of May, 2010

David J. Kappos
*Director of the United States Patent and Trademark Office*